US012626533B2

(12) United States Patent
Liu et al.

(10) Patent No.: US 12,626,533 B2
(45) Date of Patent: May 12, 2026

(54) FACIAL EXPRESSION RECOGNITION USING ENROLLMENT IMAGES

(71) Applicant: QUALCOMM Incorporated, San Diego, CA (US)

(72) Inventors: Peng Liu, San Diego, CA (US); Lei Wang, San Diego, CA (US); Ning Bi, San Diego, CA (US); Zhen Wang, San Diego, CA (US); Shiwei Jin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 18/161,628

(22) Filed: Jan. 30, 2023

(65) Prior Publication Data

US 2024/0257557 A1    Aug. 1, 2024

(51) Int. Cl.
| | |
|---|---|
| *G06V 40/16* | (2022.01) |
| *G06V 10/774* | (2022.01) |
| *G06V 10/82* | (2022.01) |
| *G06V 40/50* | (2022.01) |

(52) U.S. Cl.
CPC .......... *G06V 40/176* (2022.01); *G06V 10/774* (2022.01); *G06V 10/82* (2022.01); *G06V 40/50* (2022.01)

(58) Field of Classification Search
CPC .... G06V 40/176; G06V 10/82; G06V 10/774; G06V 40/50
See application file for complete search history.

(56) References Cited

U.S. PATENT DOCUMENTS

| | | | |
|---|---|---|---|
| 2015/0199560 A1* | 7/2015 | Gokturk | G06V 10/772 |
| | | | 382/195 |
| 2023/0130201 A1* | 4/2023 | Zhao | G06V 20/597 |
| | | | 701/1 |

OTHER PUBLICATIONS

Zhao, Xiangyun, et al. "Peak-piloted deep network for facial expression recognition." Computer Vision—ECCV 2016: 14th European Conference, Amsterdam, The Netherlands, Oct. 11-14, 2016, Proceedings, Part II 14. Springer International Publishing, 2016. (Year: 2016).*
Ramakrishnan, Sriharish, et al. "Emotion recognition from facial expressions using images with arbitrary poses using siamese network." 2021 2nd International Conference on Smart Electronics and Communication (ICOSEC). IEEE, 2021. (Year: 2021).*
Lu, Liupei, Leili Tavabi, and Mohammad Soleymani. "Self-Supervised Learning for Facial Action Unit Recognition through Temporal Consistency." In BMVC. 2020. (Year: 2020).*

(Continued)

*Primary Examiner* — David Perlman
(74) *Attorney, Agent, or Firm* — Polsinelli LLP/QUALCOMM Incorporated

(57) ABSTRACT

System and techniques are described herein for processing images to detect expressions of a subject. In one illustrative example, a method of recognizing facial expressions in one or more images includes obtaining, by a computing device, a first image of a person; obtaining expression information based on the first image and an anchor image associated with the person; and determining an expression classification associated with the first image based on the expression information.

24 Claims, 14 Drawing Sheets

(56)  References Cited

OTHER PUBLICATIONS

Georgescu M-I., et al., "Teacher-Student Training and Triplet Loss for Facial Expression Recognition under Occlusion", 2020 25th International Conference on Pattern Recognition (ICPR), IEEE, Jan. 10, 2021, pp. 2288-2295, XP033909849, p. 2989-p. 2994 figures 1,2,3.

International Search Report and Written Opinion—PCT/US2023/083425—ISA/EPO—Apr. 3, 2024.

Lungu I.A., et al., "Siamese Networks for Few-Shot Learning on Edge Embedded Devices", IEEE Journal on Emerging and Selected Topics in Circuits and Systems, Piscataway, NJ, USA, vol. 10, No. 4, Oct. 22, 2020, pp. 488-497, XP011825627.

Numers C.V., et al., "Facial Expression Recognition for Clinical Trial Self-recordings", Image-based Automated Emotion Prediction with Scarce Data Master's thesis in Computer science and engineering, Jun. 1, 2022, 85 Pages, XP93141793, p. 1-p. 2 p. 32-p. 33 figures 3.6, 3.7 Abstract.

Zhang X., et al., "Joint Expression Synthesis and Representation Learning for Facial Expression Recognition", IEEE Transactions on Circuits and Systems for Video Technology, USA, vol. 32, No. 3, Feb. 1, 2021, pp. 1681-1695, XP011902234.

* cited by examiner

1100

Obtain, By A Computing Device, A First Image Of A Person
1102

Obtain Expression Information Based On The First Image And An Anchor Image Associated With The Person
1104

Determine An Expression Classification Associated With The First Image Based On The Expression Information
1106

FACIAL EXPRESSION RECOGNITION USING ENROLLMENT IMAGES

FIELD

The present disclosure generally relates to facial expression recognition. In some examples, aspects of the present disclosure are related to facial expression recognition using enrollment images.

BACKGROUND

Deep neural networks can be used for various tasks, such as object detection. For example, convolutional neural networks can extract high-level features, such as facial shapes, from an input image, and use these high-level features to output a probability that, for example, an input image includes a dog, a cat, a boat, or a bird. While deep neural networks can detect faces, the detection of facial expressions can be difficult.

SUMMARY

In some examples, systems and techniques are described for detecting objects that are occluded in an image. The systems and techniques can improve the identification of objects and sub-features of those objects when the objects are at least partially occluded.

In some examples, systems and techniques are described for recognizing facial expressions in one or more images. The systems and techniques can identify various facial expressions and alter behavior of a device based on the facial expressions.

According to at least one example, a method is provided for recognizing facial expressions in one or more images. The method includes: obtaining, by a computing device, a first image of a person; obtaining expression information based on the first image and an anchor image associated with the person; and determining an expression classification associated with the first image based on the expression information.

In another example, an apparatus for recognizing facial expressions in one or more images is provided that includes at least one memory and at least one processor coupled to the at least one memory. The at least one processor is configured to: obtain a first image of a person; obtain expression information based on the first image and an anchor image associated with the person; and determine an expression classification associated with the first image based on the expression information.

In another example, a non-transitory computer-readable medium is provided that has stored thereon instructions that, when executed by one or more processors, cause the one or more processors to: obtain a first image of a person; obtain expression information based on the first image and an anchor image associated with the person; and determine an expression classification associated with the first image based on the expression information.

In another example, an apparatus for recognizing facial expressions in one or more images is provided. The apparatus includes: means for obtaining a first image of a person; means for obtaining expression information based on the first image and an anchor image associated with the person; and means for determining an expression classification associated with the first image based on the expression information.

In some aspects, one or more of the apparatuses described herein is, is part of, and/or includes a mobile device (e.g., a mobile telephone and/or mobile handset and/or so-called "smartphone" or other mobile device), an extended reality (XR) device (e.g., a virtual reality (VR) device, an augmented reality (AR) device, or a mixed reality (MR) device), a head-mounted device (HMD) device, a vehicle or a computing system, device, or component of a vehicle, a wearable device (e.g., a network-connected watch or other wearable device), a wireless communication device, a camera, a personal computer, a laptop computer, a server computer, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensors).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
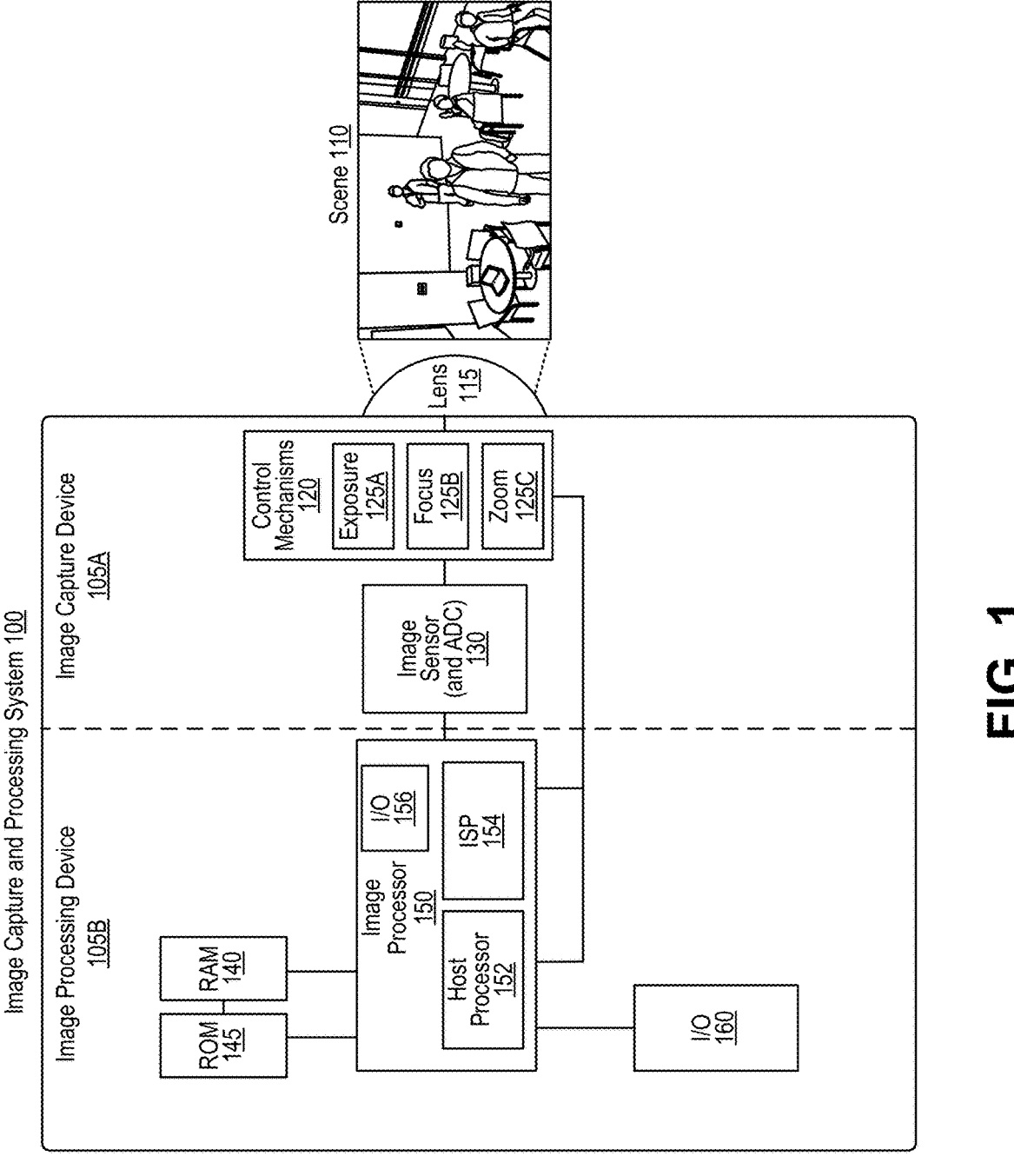
FIG. 1 is a block diagram illustrating an architecture of an image capture and processing system, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and descriptions are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during the capture of one or more image frames, such as ISO, exposure time, aperture size, f/stop, shutter speed, focus, and gain. For example, settings or parameters can be applied to an image sensor for capturing the one or more image frames. Other camera settings can configure the post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Computer vision is an important task that can be performed by computer systems to perform various tasks such as detecting human occupancy, identifying a person, tracking a person's movement, and so forth. One type of computer vision is facial recognition based on facial landmark detection, which involves localizing key (e.g., important or relevant) facial points in image frames. Key facial points can include a corner of an eye, a corner of a mouth, and the tip of a nose, among other facial points. The locations of detected facial landmarks can characterize and/or indicate the shape of a face (and the shape of one or more facial features, such as a nose or mouth). Computer vision can also identify other parts of a person, such as hands, body center, and feet, to track the person. Computer vision can be employed for many purposes, such as to identify object movement within the environment to enable an autonomous device to safely navigate the scene.

Understanding expressions and non-verbal communication is a challenging and important task with many applications. Emerging applications of expression and non-verbal communication detection include safety monitoring, social-awareness detection, and micro-expression detection. For example, a driver monitoring system may be implemented in a vehicle to ensure that a driver of the vehicle is alert and not drowsy for safety purposes. Detection of human expression can also be useful in other scenarios. For example, educational systems can track and assess a student's knowledge via inferential methods, such as the Bayesian Knowledge Tracing (BKT) algorithm. However, these systems methods are unable to identify signals that human teachers use to assess knowledge, such as indications of discomfort, engagement, or frustration. Identification of human expression can be important in identifying a user's state, such as anger, happiness, and so forth.

There can be a significant divergence in facial expressions, and it can be difficult to obtain a person's state based on the current presentation of the person. For example, some people have a neutral, unbiased facial expression that can appear to be happy, sad, or tired based on unconscious human training. The range of neutral facial expressions causes facial expression detection to be inaccurate using only a current state of the person.

The present disclosure describes systems, apparatuses, methods, and computer-readable media (collectively referred to as "systems and techniques") for detecting expressions by a person or other object. Aspects of the disclosure include obtaining expression information of a person based on a first image and an anchor image associated with the person. According to some aspects, the anchor image is an image of the person with a neutral face position without any facial expression. The expression information comprises feature vectors associated with the face, such as the position of distal ends of the mouth, curvature of the lips, rotation of eyebrows, eye position, and so forth. According to aspects of the disclosure, the expression information in the first image and the expression information in the anchor image are combined to determine an expression classification. Non-limiting examples of expression classification include surprise, fear, disgust, happiness, sadness, anger, exhaustion, sleepiness, and neutral. In some aspects, the systems and techniques can use the predicted expression classification for various purposes, such as forcing a drowsy driver of a vehicle to stop. Using such systems and techniques, accurate facial expressions can be determined.

The systems and techniques disclosed herein also include a method for training a neural network having two parallel branches to predict expressions. The first parallel branch is trained by using images of a person with an expression, or a biased facial image, and the second parallel branch is trained using images of the person without an expression, or a neutral facial image. The convolution in the parallel branches uses shared weights to extract features, and the parallel branches are cross-coupled to share the extracted features. One of the parallel branches is configured to concatenate the features from the neutral image and the biased image, and the other parallel branch is configured to subtract the features from the neutral image and the biased image. The expressions are classified in each branch, and then an error is computed and back-propagated to modify the weights. Training the branches of the neural network branches in parallel trains the neural network to identify distinctions between the neutral image and the biased image to improve expression classification.

It should be noted that although the detection of expressions of images is described, the systems and techniques can be applied to types of sensor information, such as three-dimensional (3D) point cloud data, two-dimensional (2D) distance information from a time of flight (ToF) sensor, and so forth.

Additional details and aspects of the present disclosure are described in more detail below with respect to the figures.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image capture and processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for PDAF. In some cases, the opaque and/or reflective masks may be used to block portions of the electromagnetic spectrum from reaching the photodiodes of the image sensor (e.g., an IR cut filter, an ultraviolet (UV) cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 14:
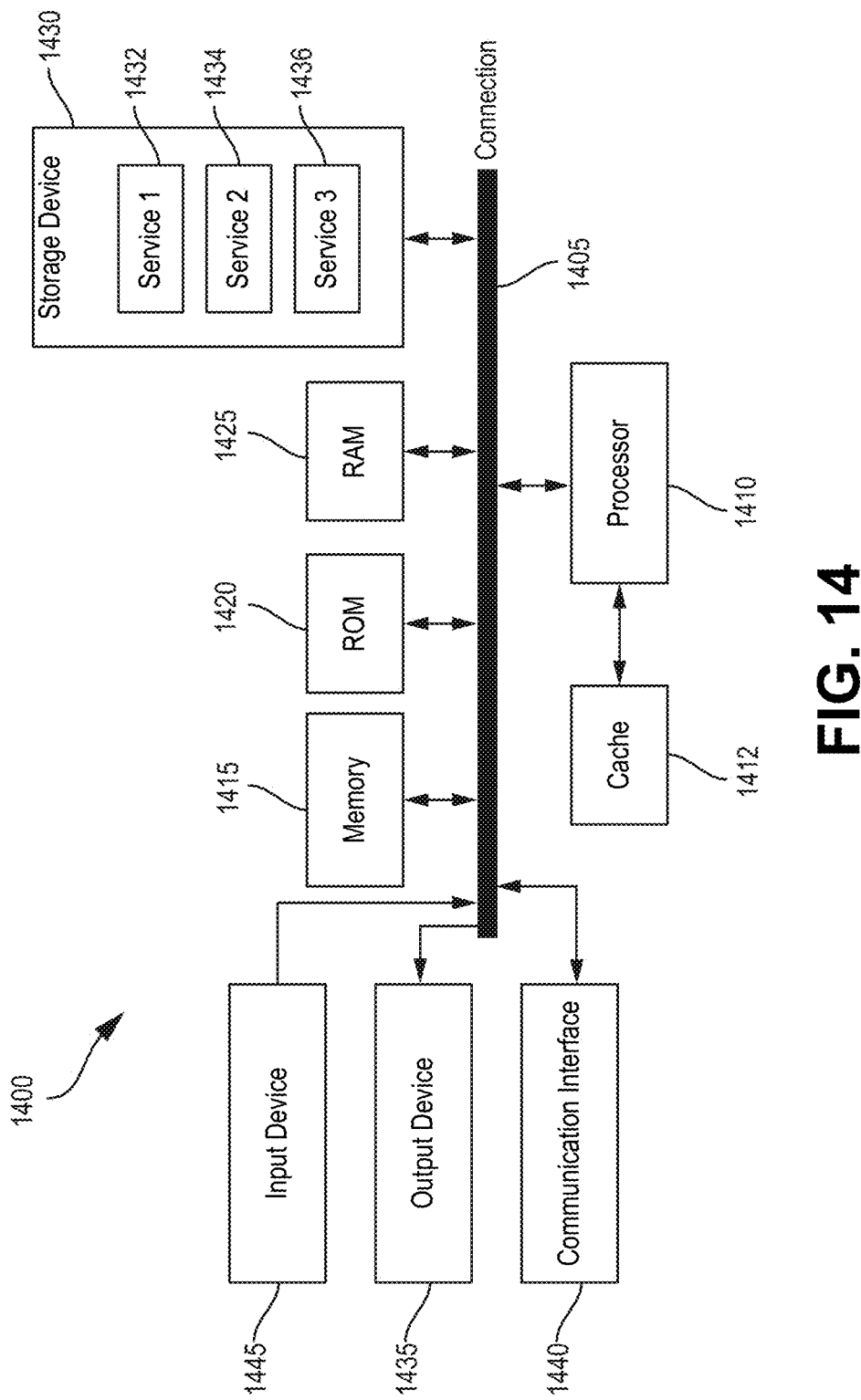
FIG. 14 is a diagram illustrating an example of a system for implementing certain aspects described herein.

The image processor 150 may include one or more processors, such as one or more image signal processors (ISPs) (including ISP 154), one or more host processors (including host processor 152), and/or one or more of any other type of processor 1410 discussed with respect to the computing system 1400 of FIG. 14. The host processor 152 can be a digital signal processor (DSP) and/or other type of processor. In some implementations, the image processor

150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), digital signal processors (DSPs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 1 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1425, read-only memory (ROM) 145/1420, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

In some examples, the computer vision system of FIG. 3 (described below) can include the image capture and processing system 100, the image capture device 105A, the image processing device 105B, or a combination thereof.

An artificial neural network attempts to replicate, using computer technology, logical reasoning performed by biological neural networks. Neural networks fall within a sub-field of artificial intelligence called machine learning. Machine learning is a field of study that investigates giving computers the ability to learn without being explicitly programmed. A software program that is explicitly programmed must account for all possible inputs, scenarios, and outcomes. In contrast, a software program that uses machine learning algorithms learns by being given inputs and receiving feedback as to the correctness of the output the program produces. The feedback is incorporated into the software, so that the software can produce a better result for the same or similar input.

Neural networks take inspiration from the mechanics of the operation of biological neural networks, to the extent that these operations are understood. According to various models of biological neural networks, the main computational element of the brain is the neuron. Neurons are connected together with a number of elements, with elements entering a neuron being referred to as dendrites and an element leaving a neuron being referred to as an axon. A neuron accepts signals via dendrites, performs a computation on the signals, and outputs a signal on an axon. The input and output signals are referred to as activations. The axon of one neuron can branch out and be connected to the dendrites of multiple neurons. The connection between a branch of an axon and a dendrite is called a synapse.

A synapse can scale the signal crossing the synapse. The scaling factor is referred to as a weight and provides a technique to learn, with different weights resulting from different responses to input. Learning can change the weights, but the organization of the neurons and synapses need not change to obtain the learning. The static structure of the neural networks is used as a model to implement software learning, and the weights can reflect a task or tasks that the software has learned to perform.

Neural networks operate on the notion that a neuron's computation involves a weighted sum of input values. These weighted sums correspond to the value scaling performed by the synapses and the combining of those values in the neuron. A functional operation is performed in the neuron on the combined inputs. In the biological neural network model, the operation appears to be a non-linear function that causes the neuron to generate an output when the inputs cross some threshold. In some aspects, by analogy, a node of a neural network can apply a non-linear function to the weighted sum of the values input into the node.

Figure 2:
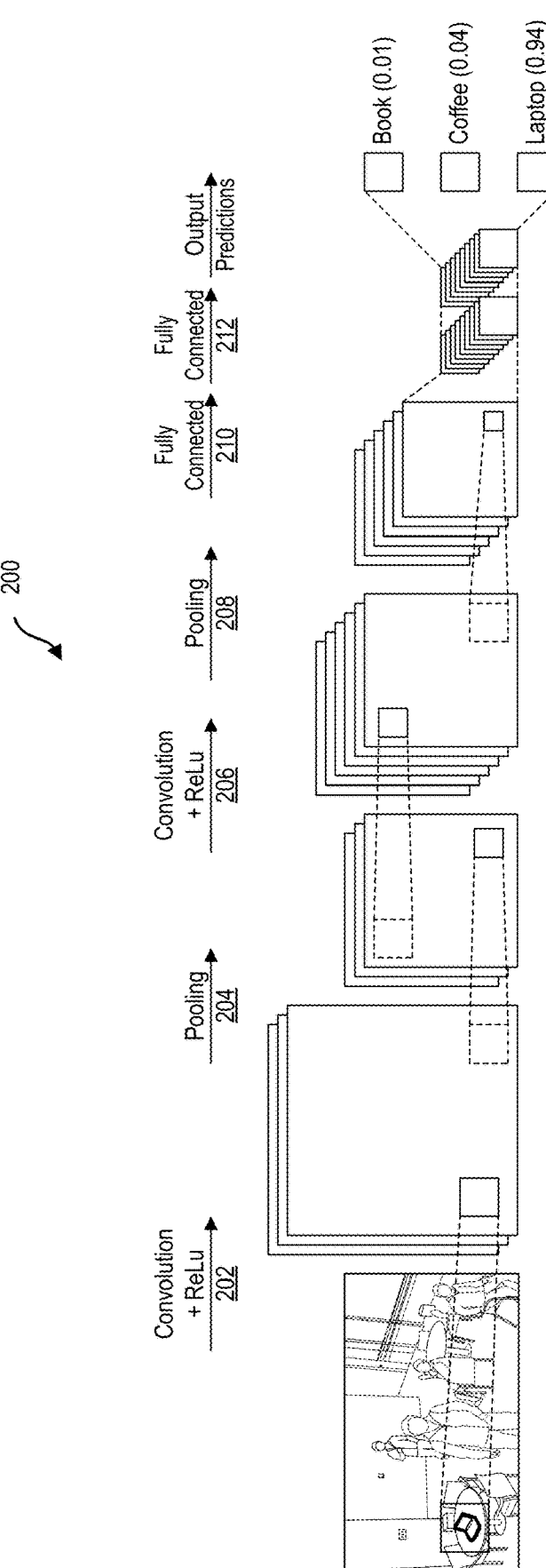
FIG. 2 is a diagram illustrating an example of a model for a convolutional neural network.

FIG. 2 is a diagram illustrating a model 200 of a convolutional neural network. The model 200 illustrates operations that can be included in a convolutional neural network: convolution, activation, pooling or sub-sampling, batch normalization, and output generation (e.g., a fully connected layer). Any given convolutional network includes at least one convolution layer, and can have tens of convolution layers. Additionally, each convolutional layer need not be followed by a pooling layer. In some examples, a pooling layer may occur after multiple convolution layers, or may not occur at all. The example convolution network illustrated in FIG. 2 classifies an input image 220 into one of three categories: book, coffee, or laptop. In the illustrated example, based on receiving an image as input, the convolutional neural network outputs the highest probability for "laptop" (0.94) among the output predictions 214.

In some aspects, to produce the illustrated output predictions 214, the convolutional neural network performs a first convolution with a rectified linear unit (ReLU) 202, pooling 204, a second convolution with ReLU 206, additional pooling 208, and then categorization using two fully-connected layers. In the first convolution with ReLU 202 step, the input image 220 is convoluted to produce one or more output feature maps 222. The first pooling 204 operation produces additional feature maps, which are input feature maps 224 for the second convolution and ReLU 206 operation. The second convolution and ReLU 206 operation produce a second set of output feature maps 226. The second pooling 208 step also produces feature maps 228, which are input into a first fully-connected 210 layer. The output of the first fully-connected 210 layer is input into a second fully-connected 212 layer. The outputs of the second fully-connected 212 layer are the output predictions 214. In convolutional neural networks, the terms "higher layer" and "higher-level layer" refer to layers further away from the input image (e.g., in the example model 200, the second fully-connected 212 layer is the highest layer).

Other aspects can include additional or fewer convolution operations, ReLU operations, pooling operations, and/or fully-connected layers. Convolution, non-linearity (e.g., ReLU), pooling or sub-sampling, and categorization operations will be explained in greater detail below.

A convolutional neural network operates on a numerical or digital representation of the image to perform object detection in an image. An image can be represented in a computer as a matrix of pixel values. For example, a video frame captured at 1080p includes an array of pixels that is 1920 pixels across and 1080 pixels high. Certain components of an image can be referred to as a channel. For example, a color image may have three channels: red, green, and blue. In this example, a color image can be represented as three two-dimensional matrices based on different color space models. One conventional color space is red, green blue with the horizontal and vertical axis indicating a pixel's location in the image and a value between 0 and 255 indicating a color intensity for the pixel. Other color spaces include cyan, magenta, yellow, black (CMYK), a luminance color space such as YUV or YPbPr, and so forth. As another example, a greyscale image has only one channel and thus can be represented as a single two-dimensional matrix of pixel values. In this example, the pixel values can also be between 0 and 255, with 0 indicating black and 255 indicating white, for example. The upper value of 255, in these examples, assumes that the pixels are represented by 8-bit values. In other examples, the pixels can be represented using more bits (e.g., 16, 32, or more bits), and thus can have higher upper values.

In some aspects, convolution uses a mathematical operation to extract features from an input image. Features that can be extracted include, for example, edges, curves, corners, blobs, and ridges, among others. Convolution preserves the spatial relationship between pixels by learning image features using small squares of input data. Another example of a convolutional neural network is described below with respect to FIG. 13.

Figure 3:
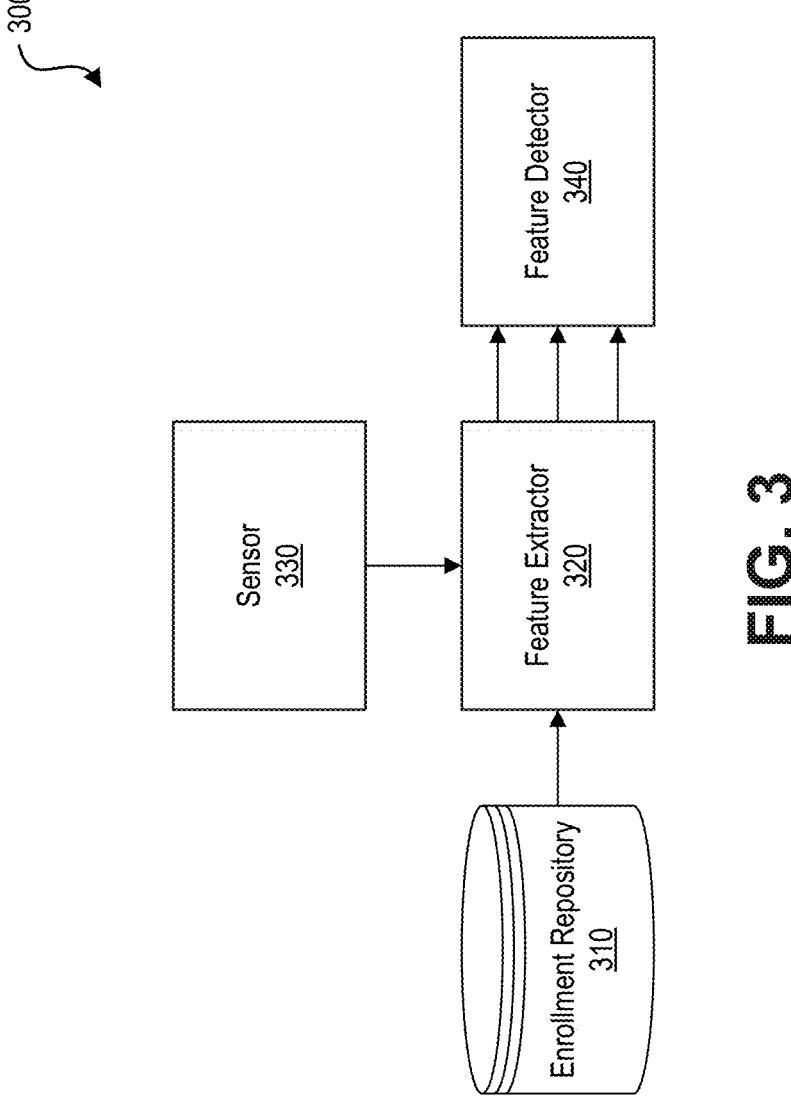
FIG. 3 is a conceptual diagram illustrating an architecture of a computer vision system 300 according to various aspects of the disclosure.

FIG. 3 illustrates a conceptual diagram of a computer vision system 300 illustrating the detection of expressions of a user according to various aspects of the disclosure. In some aspects, the computer vision system 300 can be integral to another system, such as a vehicle, a camera, or another device. The computer vision system 300 includes an enrollment repository 310, such as a database including enrollment data or a filesystem storage mechanism storing enrollment data, a neural network 320, a sensor 330, and fully connected layers 340 to synthesize information from the neural network 320.

Figure 4:
FIG. 4 illustrates a block diagram of a computer vision system 400 for performing enrollment according to various aspects of the disclosure.
Figure 4:
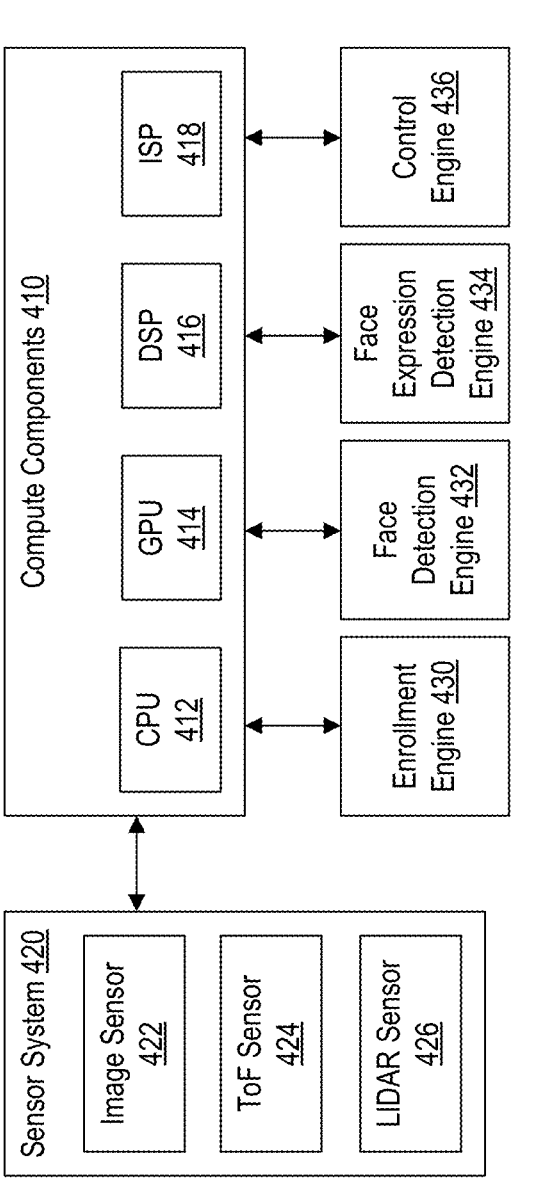

In some aspects, the sensor 330 is configured to sense and provide sensor data to the neural network of the computer vision system 300. For example, the sensor 330 may be at least one of an image sensor (e.g., the image sensor 422 of FIG. 4), a time of flight (ToF) sensor (e.g., the ToF sensor 424 of FIG. 4), and a light detection and ranging (LIDAR)

sensor (e.g., the LIDAR sensor 426 of FIG. 4). In some aspects, the sensor 330 provides the sensor data at runtime, which occurs while the software is executing to perform functionality for a downstream user. For example, if the computer vision system 300 is implemented in a vehicle, the runtime occurs when a person (or driver) is operating (e.g., driving) the vehicle. In the case of software, software instructions that are written at design time are compiled at compile time into machine instructions that are executed by a hardware processor of a user's computer at runtime.

Figure 10:
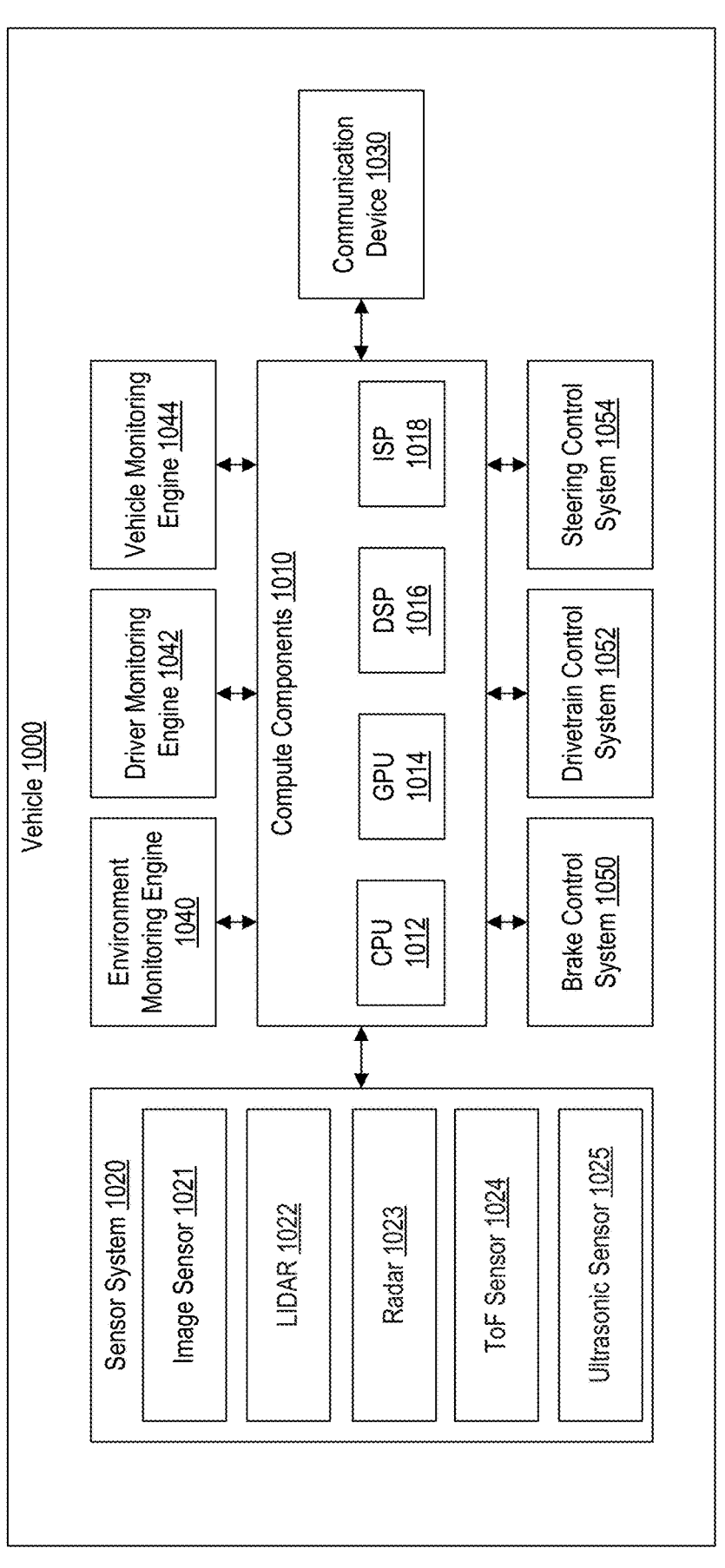
FIG. 10 illustrates a block diagram of a vehicle that includes computer vision system to monitor facial expressions, in accordance with certain aspects of the present disclosure.

In some aspects, at runtime, the neural network 320 may be configured to search the enrollment repository 310 of a person (not shown) that is using the computer vision system 300 or a device including the computer vision system 300 (e.g., the vehicle 1000 of FIG. 10). For example, the neural network 320 may be configured to receive an anchor object (e.g., the anchor image, or data extracted from the anchor image) from the enrollment repository 310 to compare with a runtime image from the sensor 330 perform various functions (e.g., authentication). User enrollment, which also may be referred to as user registration, is performed to receive user information that is used during the operation of the computer vision system 300. The anchor object can be captured during enrollment or generated during enrollment and is used to determine different expressions, such as a facial expression or a body expression. For example, the anchor object may be an image of the user of the computer vision system 300 with a neutral facial expression. In other cases, the data that is captured during enrollment may be biased (e.g., with the user biasing muscles in the face to provide a facial expression).

In some cases, the computer vision system 300 may be configured to generate an anchor object based on biased data that is obtained during enrollment, such as enrollment images of the user. The computer vision system 300 may use the enrollment to generate an anchor object. For example, in the case of capturing an enrollment image with a biased face (e.g., the user is smiling), the computer vision system 300 is configured to generate an anchor image based on the enrollment images. Examples of enrollment images are illustrated in FIGS. 6A-6D.

Figure 8:
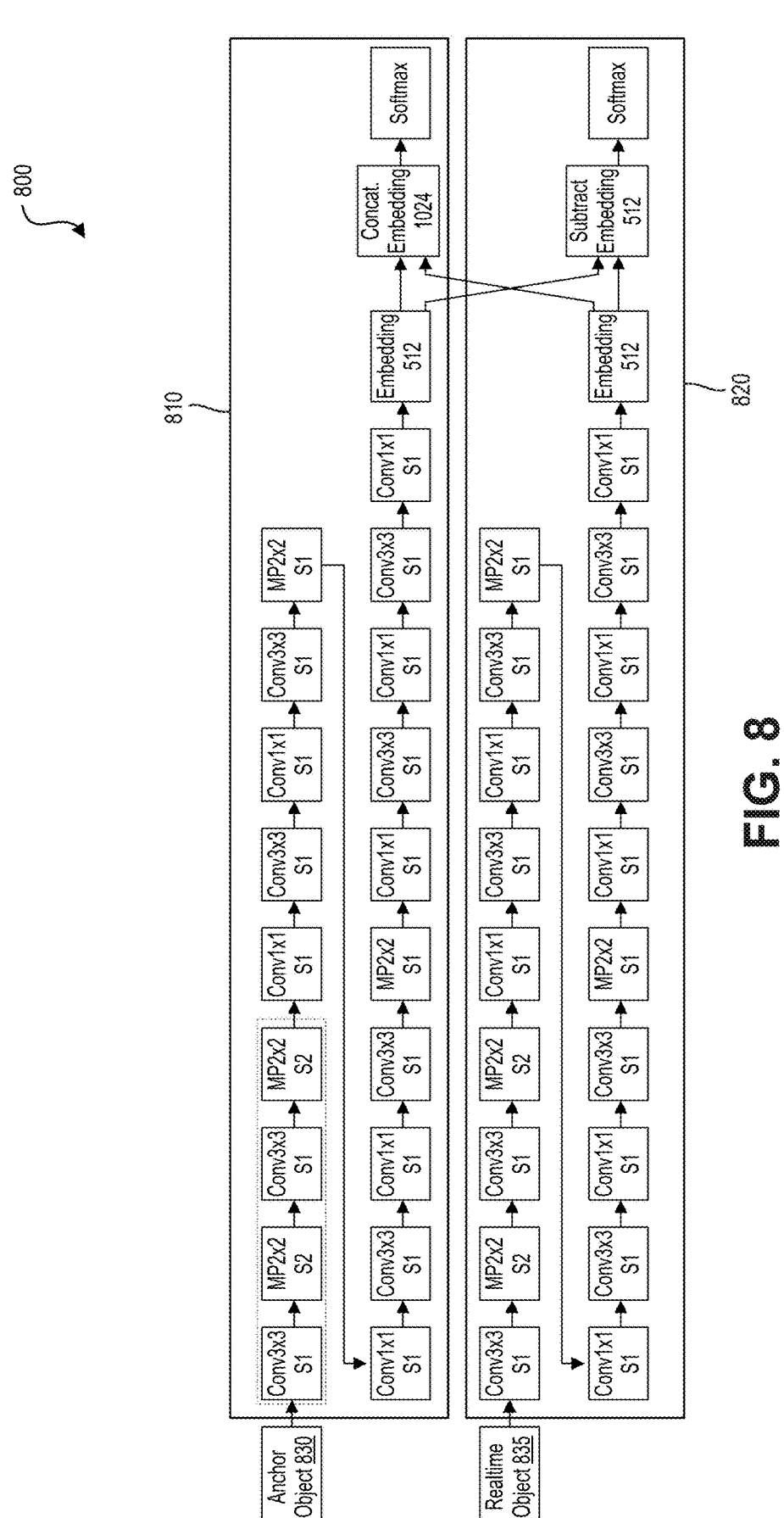
FIG. 8 illustrates a detailed block diagram of an example neural network 800 that is trained to detect facial expressions, in accordance with certain aspects of the present disclosure.

In some aspects, the neural network 320 may be configured to use data extracted from the anchor object and the runtime image to identify expressions of the subject matter in the runtime image. For example, the neural network 320 may be configured to extract facial expressions from the runtime image based on the anchor image or data extracted from the anchor image. In some other aspects, the neural network 320 may be configured to extract other types of expressions, such as non-verbal communication provided by body language. For example, the neural network 320 may be configured to identify physical movement by a person, such as monitoring a person in a hospital bed for seizures. In some aspects, the neural network 320 may be configured to identify a plurality of features that correspond to different facial expressions, such as the position of a person's mouth, the position of the eyelids, dilation of the eyes, the angle of various features of the mouth, biasing of various muscles in the face, an angle of orientation of eyebrows, and so forth. In some aspects, the number of features may be referred to as embeddings. For example, the neural network 800 illustrated in FIG. 8 illustrates two neural networks that each output 512 different embeddings.

The neural network 320 may be configured to output the detected information to a fully connected layer 340 to synthesize the various features and infer ab expression based on a neural network 320. In some aspects, the fully connected layer 340 is trained to synthesize the various embeddings provided by the neural network 320 into a determined facial expression. For example, the computer vision system 300 that is integral into an autonomous vehicle can determine that the user is not attentive and provide an alarm to warn the user to monitor autonomous driving operation. In some cases, the neural network 320 may be a feed-forward network that accumulates the different embeddings and determines a facial expression.

FIG. 4 is a conceptual diagram illustrating an architecture of a computer vision system 400 according to various aspects of the disclosure. In some aspects, the computer vision system 400 includes compute components 410, a sensor system 420, an enrollment engine 430, a face detection engine 432, a facial expression detection engine 434, and a control engine 436.

The one or more compute components 410 can include a CPU 412, a GPU 414, a DSP 416, an ISP 418, and/or another processor (e.g., a neural processing unit (NPU) implementing one or more trained neural networks). The compute components 410 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein.

In some examples, the compute components 410 can receive and process various sensor information provided by the sensor system 420. In some aspects, the sensor system 420 can include different types of sensors for detecting a person. For example, the sensor system 420 can include at least of an image sensor 422, a ToF sensor 424, and a LIDAR sensor 426. The compute components 410 may also be configured to provide instructions to the sensor system 420 to control the various sensors. For example, the compute components 410 may control an aperture and exposure time of the image sensor 422.

In the example shown in FIG. 4, the engines 430-436 may access hardware components, such as components 402-418, or another engine 430-436 via one or more application programming interfaces (APIs) (not shown). Generally, APIs are a set of functions, services, and/or interfaces, which act as a connection between computer components, computers, or computer programs. The APIs may provide a set of API calls that may be accessed by applications that allow information to be exchanged, hardware to be accessed, or other actions to be performed. The APIs translate the requests into instructions for the various compute components to perform, such as an instruction to capture an image using the image sensor 422.

In some examples, the image sensor 422 can capture image data and can generate images (also referred to as frames) based on the image data and/or can provide the image data or frames to the enrollment engine 430, the face detection engine 432, the facial expression detection engine 434, and/or the control engine 436 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some aspects, the enrollment engine 430 can use the image information from the image sensor 422 to enroll a person to use the computer vision system 400 for various tasks. In some aspects, the computer vision system 400 can be a vehicle configured to monitor the driver for various purposes, such as for drowsiness or attentiveness. As an example, the vehicle may be a long-haul truck that monitors the driver to ensure that the driver is not tired and is paying attention for safety reasons. In another example, the computer vision system 400 may be implemented in a semi-autonomous vehicle that, while the vehicle is performing navigation of a driving route, monitors the driver to ensure that the autonomous navigation is being monitored by the driver. According to some aspects, the computer vision system 400 is configured to capture enrollment images of the user of the computer vision system 400. In some aspects, the enrollment engine 430 may also be configured to generate an image of the person based on the captured enrollment images. For example, the enrollment engine 430 may be configured to detect that the user's face is biased in some fashion, such as smiling or frowning and can generate an image that corresponds to the user's neutral face (e.g., unbiased). In some aspects, the enrollment engine 430 may be configured to generate an anchor image or data pertaining to the anchor image during enrollment. The data pertaining to anchor image can include a plurality of feature vectors that are associated with the person's face in a neutral position.

It should be noted that although the descriptions herein relate to images, sensed data provided by other sensors can be used to detect facial expressions. For example, the ToF sensor detects distance information and may be configured to generate a 3D model that can be used to detect facial expressions. The expressions are also not limited to facial expressions and can be used to identify body expressions or other body activities. For example, the expressions may be a non-voluntary expression of the body (e.g., a seizure), non-verbal communication, or other expressions that can be associated with the state of the user. Non-limiting examples of the state of the user include surprise, fear, disgust, happiness, sadness, anger, exhaustion, sleepiness, and neutral.

In some aspects, the face detection engine 432 may be configured to detect the face of a person for various purposes. In one aspect, the face detection engine 432 may detect the face of the person to authenticate the identity of the person to authorize the person to use the computer vision system 400. For example, the computer vision system 400 may be integrated into a vehicle to authenticate and authorize a person to drive the vehicle. In some aspects, facial expression detection engine 434 may be configured to detect the facial expressions of the person. For example, non-limiting facial expressions that the facial expression detection engine 434 may be configured to detect include surprise, fear, disgust, happiness, sadness, anger, exhaustion, sleepiness, and neutral. In some aspects, the facial expression detection engine 434 may be configured to detect facial expressions based on an anchor image that is captured or generated during enrollment.

In some aspects, based on the expressions detected by the facial expression detection engine 434, the control engine 436 is configured to a system that the computer vision system 400 is implemented in. For example, the computer vision system 400 may be implemented into a long-haul truck and may require the driver of the long-haul truck to rest when the facial expression detection engine 434 detects that the driver is tired (e.g., drowsy) based on the detected facial expressions. In another example, the facial expression detection engine 434 may detect that the driver is angry and the control engine may limit the driver's ability to accelerate.

In some aspects, the computer vision system 400 can include other engines for various purposes. For example, the computer vision system 400 can include a pre-processing engine to preprocess images or other data captured by the sensor system 420 to improve various operations.

It should be noted that the components 410-336 shown in FIG. 4 are non-limiting examples provided for illustrative and explanation purposes, and other examples can include more, less, or different components than those shown in FIG. 4. For example, in some cases, the computer vision system 400 can include one or more other sensors (e.g., one or more inertial measurement units (IMUs), radio detection and ranging (RADAR) sensors, sound detection and ranging (SODAR) sensors, sound navigation and ranging (SONAR) sensors, audio sensors, etc.), one or more display devices, one more other processing engines, one or more communication modules, one or more other hardware components, and/or one or more other software and/or hardware components that are not shown in FIG. 4. While various components of the computer vision system 400, such as the image sensor 422, may be referenced in the singular form herein, it should be understood that the computer vision system 400 may include multiple of any component discussed herein (e.g., multiple image sensors 422).

Figure 5:
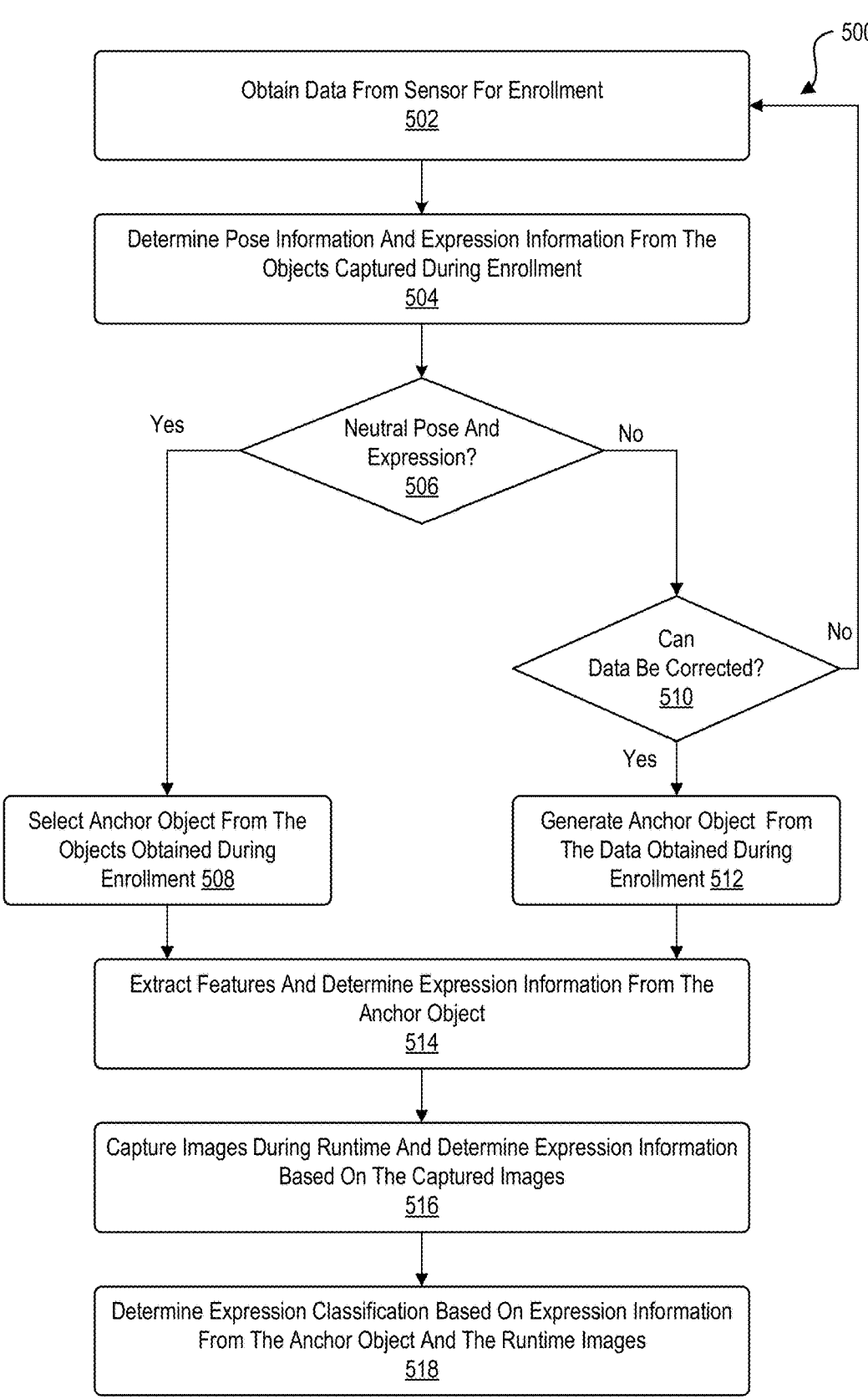
FIG. 5 is a flowchart illustrating an example of a method for enrolling a user for performing facial expression recognition, in accordance with certain aspects of the present disclosure.

FIG. 5 is a flowchart illustrating an example of a method for enrolling a user for performing facial expression recognition, in accordance with certain aspects of the present disclosure. The method 500 can be performed by a computing device (or a component of the computing device) having a touch screen, such as a mobile wireless communication device, a smart speaker, a camera, an XR device, a wireless-enabled vehicle, or another computing device. In one illustrative example, the computer vision system 300, which includes a computing system 1400 of FIG. 14, can be configured to perform all or part of the method 500. In some aspects, the method 500 can be performed offline using another system, such as a cloud system. In some cases, the method 500 can be performed at a specific local site, such as a location designated by a business or other entity (e.g., an administrative agency, or a non-profit organization). For example, a business entity may require an employee to perform the method 500 at an approved local site.

At block 502, the computing system (e.g., the computing system 1400) is configured to obtain sensor data for the enrollment of a user of the system. For example, the system can be a vehicle or machine that performs a function, such as monitoring the user for safety purposes. In some aspects, the sensor may be any suitable sensor associated with the system. In the case of a vehicle, the sensor may be an image sensor and the data may be image data (e.g., a bitmap image). In other cases, the sensor may be a ToF sensor that produces an array of distances (e.g., a 2D array of distances, a 3D array of distances, etc.).

At block 504, the computing system (e.g., the computing system 1400) is configured to determine pose information and expression information from the sensor data obtained during the enrollment. For example, non-limiting examples of sensor data include image data in the case of an image sensor or 2D or 3D arrays of distances in the case of a ToF sensor. In some cases, the computing system 1400 may be configured to detect the pose of the subject. In one aspect, in the case of the subject being a user of the system, the pose of the subject is the pose and orientation of the user's head, such as the user's head orientation and focal point. In some cases, a neutral pose comprises a center point of the subject that is normal to capture plane of the sensor. In some other aspects, the computing system 1400 may be configured to identify some facial expressions, such as the user smiling or making another gesture. In this case, the facial expression detection may be limited based on detecting features that indicate obvious biasing, such as the curvature of the lips, an open mouth, closed eyes, etc.

At block 506, the computing system (e.g., the computing system 1400) is configured to determine whether the pose information and the expression information correspond to a neutral position and pose. In one aspect, the pose information may be deemed neutral based on a range within a normal vector. For example, if the center vector of the user's face is perpendicular to a sensor (e.g., a profile of the user's face), the user's pose is outside of the minimum threshold requirement. In some aspects, the computing system may also identify various features related to an expression, such as minimum eye size, to determine that the expression information corresponds to a neutral face.

If the pose information and the expression information correspond to a neutral face and pose, the computing system may select the sensor data as an anchor object at block 508. If the pose information and the expression information do not correspond to a neutral face and pose, the method proceeds to block 510.

At block 510, the computing system (e.g., the computing system 1400) is configured to determine if the sensor data can be corrected. In some aspects, if the pose information is within a particular range, the computing system may be configured to generate an image of the user that correct at least one of the pose information and the expression information. If the computing system cannot correct the pose information or the expression information, the computing system returns to block 502 to obtain additional sensor data.

At block 512, the computing system (e.g., the computing system 1400) is configured to generate an anchor object from the sensor data obtained during enrollment. For example, the computing system may be configured to rotate an image of the user's face within a 3D space to have a neutral pose. In some other aspects, the computing system may be configured to generate the anchor object in a manner that unbiases some features in the sensor data. Examples of correcting images captured during enrollment are further illustrated in FIGS. 6A-6D. In some aspects, blocks 502 to 512 occur during the enrollment of the user.

At block 514, after the anchor object is selected at block 508 or after the anchor object is generated at block 512, the computing system (e.g., the computing system 1400) is configured to extract features and determine expression information from the anchor object. In some aspects, the features may be related to various aspects that are used to identify the state of the user as described above. Non-limiting examples of features include eye opening, mouth opening, distal positions lip edges, curvature of the lips, and so forth. In general, the computing system is trained to identify many features in realtime, and the features are used to identify probabilities associated with each state of the user. In some aspects, the expression information includes mathematical information (e.g., vectors) that may be input into fully connected layers to identify probabilities of a set of expression classifications. For example, as described below, the computing system can generate 512 different embeddings. In some aspects, block 514 may occur during the enrollment of the user or at runtime.

At block 516, the computing system (e.g., the computing system 1400) is configured to capture images during runtime (e.g., when the user is driving a vehicle) and determine expression information based on the captured images. In one aspect, the captured images can be provided to a feature detector (e.g., convolution layers 712) to extract features related to the captured images. For example, features relevant to the an expression, such as a face expression, can be extracted from the captured images.

At block 518, the computing system (e.g., the computing system 1400) is configured to determine an expression classification from a set of expression classifications based on the expression information from the anchor image and the expression information from the captured images at runtime. For example, the computing system can determine whether the user is in a state of surprise, fear, disgust, happiness, sadness, anger, exhaustion, sleepiness, and neutral.

Figure 6A:
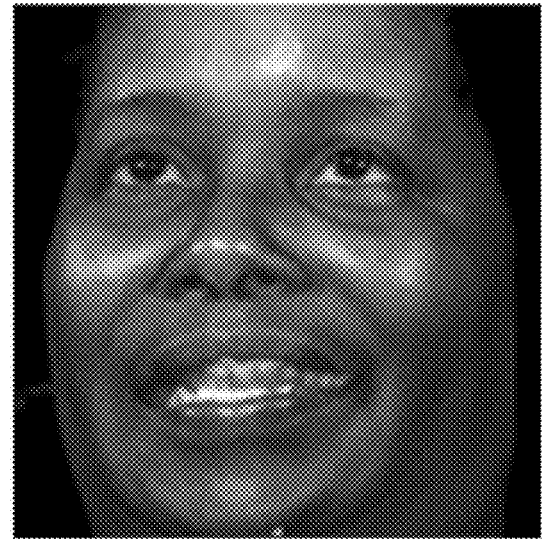
FIGS. 6A-6D illustrates various images captured or generated by an enrollment system in accordance with certain aspects of the present disclosure.
Figure 6B:

FIG. 6A illustrates an example image that is captured by an enrollment system. In some aspects, an orientation vector is associated with the face in FIG. 6A and is not normal to an image sensor that captures this image. In addition, the face in FIG. 6A is smiling. FIG. 6B illustrates an example anchor image that is generated to correspond to the captured face in FIG. 6A. For example, the enrollment engine 430 of FIG. 4 may be configured to determine that the user's pose information is within a range, and may generate an enrollment image corresponding to FIG. 6B. As described above with reference to FIG. 5, a 3D rotation of the image can be applied to the image to align the face in a 2D bitmap image. In other aspects, the enrollment engine 430 may also be configured to modify the image to correspond to an anchor image.

Figure 6C:
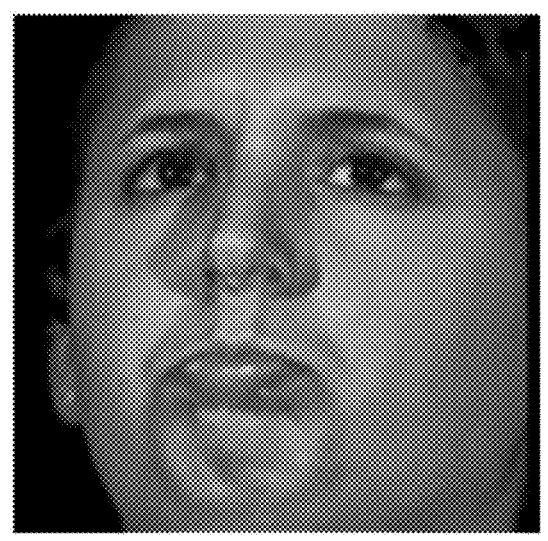
Figure 6D:

FIG. 6C also illustrates an example image that is captured by the enrollment system, and an orientation vector associated with the face in FIG. 6A is not normal with respect to an image sensor that captures this image. FIG. 6D illustrates an anchor image that is generated by the enrollment system, such as the enrollment engine 430 of FIG. 4.

Figure 7:
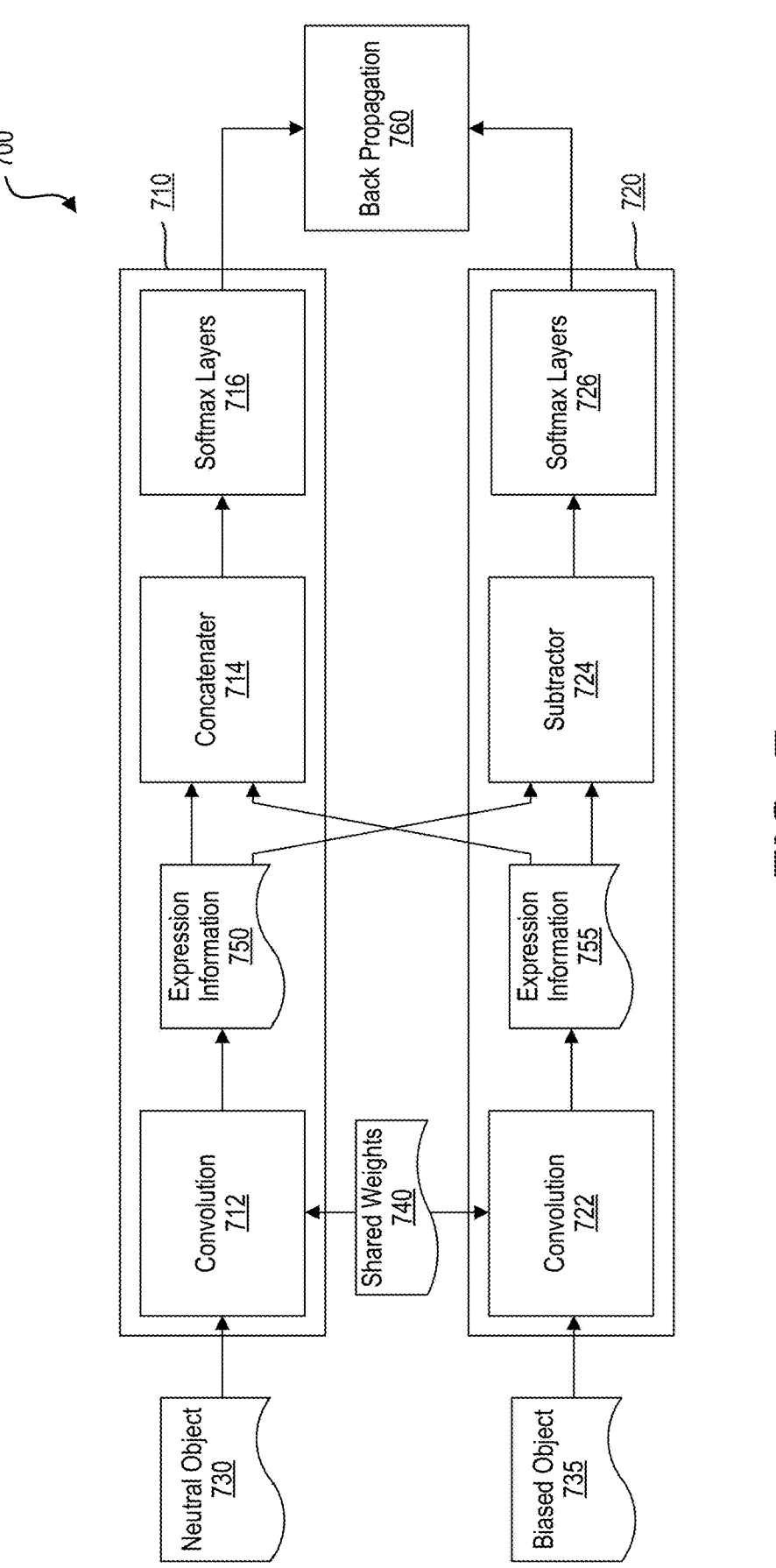
FIG. 7 illustrates a block diagram of a system for training a neural network for detecting facial expressions, in accordance with certain aspects of the present disclosure.

FIG. 7 illustrates a block diagram of a training system 700 for training a neural network for detecting facial expressions, in accordance with certain aspects of the present disclosure. In some aspects, the training system 700 includes a first neural network 710 and a second neural network 720 that are concurrently trained in parallel. In one aspect, the first neural network 710 achieves multiple classifications by concatenating embeddings, and the second neural network 720 represents object similarity by subtracting the embeddings to distinguish more personalize facial expressions. The first neural network 710 may include convolution layers 712 to extract features, a concatenator 714 to concatenate features identified in another object (e.g., another image), and softmax layers 716 to classify and identify features. The second neural network 720 may include convolution layers 722 to extract features, a subtractor 724 to subtract features identified in another object (e.g., another image), and softmax layers 726 to identify features based on the result of the subtraction.

According to some aspects, a back propagation 760 is configured to use the determined losses and perform backpropagation and adjust the shared weights 740, and individual weights associated with each of the first neural network 710 and the second neural network 720. For example, the back propagation 760 may separately adjust weights associated with the concatenator 714 and the subtractor 724. In some aspects, the concatenator 714 and the subtractor 724 may be implemented by fully connected layers that are trained to transform the features, such as the concatenated features or the subtracted features identified in the neutral object 730 and the corresponding biased object 735.

In some aspects, the training system 700 uses training data that includes a neutral object 730 having a subject (e.g., a person) in a neutral position, such as an expressionless front image, and a corresponding biased object 735 having the same subject in a biased position, such as an image of the subject providing a facial expression. For example, the neutral object 730 can be a frontal image of a person with a neutral, unbiased facial expression, and the corresponding biased object 735 can be a similar frontal image of the person with a biased facial expression (e.g., smiling). The training system 700 is configured to train the various weights (e.g., the shared weights 740, weights associated with the concatenator 714, weights associated with the subtractor 724, etc.) to classify a state of the user (e.g., surprise, fear, disgust, happiness, sadness, anger, exhaustion, sleepiness, and neutral).

In some aspects, the first neural network 710 includes convolution layers 712 and the second neural network 720 also includes convolution layers 712 that are configured to extract various embeddings related to the subject based on shared weights 740 that are trained by the training system 700. In some aspects, the convolution layers 712 and the convolution layers 722 differ based on the object input to extract features, and are shown as separate for illustrative purposes. In other cases, the convolution layers 712 and the convolution layers 722 may be different and have a different configuration. The convolution layers 712 are configured to generate expression information 750, which may include various embeddings related to features identified in the neutral object 730. For example, the neural network 800 of FIG. 8 is configured to detect 512 different embeddings associated with the neutral object 730 that are contained within the expression information 750. In some aspects, the convolution layers 722 are configured to expression information 755 from the biased object, and can include various embeddings related to features identified in the biased object 735.

In some aspects, the first neural network 710 and the second neural network 720 are cross-coupled to share the expression information 750 and the expression information 755 to the concatenator 714 and the subtractor 724. In some aspects, the concatenator 714 is configured to concatenate the embeddings identified in the neutral object 730 and the corresponding biased object 735. As illustrated in FIG. 8, the concatenation of the expression information 750 and the expression information 755 provides a total of 1024 embeddings. The concatenation of the expression information 750 and the expression information 755 in the first neural network 710 achieves a multi-class classification of two different objects, such as an unbiased facial image and a biased facial image.

The subtractor 724 is configured to subtract the expression information 750 and the expression information 755 to determine embedded pairwise similarity of the neutral object 730 and the corresponding biased object 735. In this case, dissimilar inputs are far from each other and the difference of the embeddings with the neutral object 730 and the corresponding biased object 735 identify micro expression and personalized expressions.

In some aspects, each of the softmax layers 716 and the softmax layers 726 may be the last activation function of a neural network and normalize the output into a probability distribution of predicted output classes. For example, in the case of facial expressions, the softmax layers 716 and the softmax layers 726 are configured to classify the embeddings into surprise, fear, disgust, happiness, sadness, anger, exhaustion, sleepiness, and neutral.

The softmax layers 716 and the softmax layers 726 are configured to provide their probability distribution of predicted output classes to a back propagation 760 function. In some aspects, the back propagation 760 is configured to compute a gradient of the loss function with respect to the shared weights 740, and weights associated with each of the concatenator 714 and the subtractor 724 based on the outputs from the softmax layers 716 and the softmax layers 726. Based on the losses determined by the back propagation 760, the back propagation 760 may determine updated weights and propagate the updated weights into the first neural network 710 and the second neural network 720. For example, the back propagation 760 updates the shared weights 740 and weights associated with the concatenator 714 and the subtractor 724.

In some aspects, the parallel concurrent training of the first neural network 710 and the second neural network 720 configure the convolution layers 712 to detect differences between the neutral object 730 and the corresponding biased object 735. In some other aspects, the parallel concurrent training of the first neural network 710 and the second neural network 720 also train the concatenator 714 to identify features relevant to the classification by the softmax layers (e.g., the softmax layers 716).

In some aspects, the center loss can be implemented to increase the accuracy of the first neural network 710 and the second neural network 720. In some cases, classifications can be tightly grouped because a small change in an input feature can shift the classification boundaries. In some aspects, a center loss can be implemented in the center of the different embeddings, to increase inter-class distance. For example, a hyperparameter $\lambda$ is introduced to control the strength of the regularization, and increasing $\lambda$ increases the separation of the class centers.

It should be understood that the training system 700 trains the first neural network 710 and the second neural network 720 offline, and at least one of the first neural network 710 or the second neural network 720 are implemented in computer vision system to perform various functions based on detected expressions. For example, the training provided by the training system 700 may ensure that at least one of the first neural network 710 and the second neural network 720 alone are sufficient to identify differences between the neutral object 730 and the corresponding biased object 735 at runtime. An example of an implementation of the first neural network 710 at runtime is further illustrated in FIG. 9.

FIG. 8 illustrates a detailed block diagram of an example neural network 800 that is trained to detect facial expressions, in accordance with certain aspects of the present disclosure. In some aspects, the neural network 800 includes a deep convolution neural network and comprises a first neural network 810 and a second neural network 820 for extraction of features from the anchor object 830 and the realtime object 835. Each of the first neural network 810 and the second neural network 820 comprise five blocks, with each block having several convolution layers, and each layer is connected to every other layer in a feed-forward arrangement. A max pooling layer (e.g., MP2×2) separates the various convolution blocks. Each layer receives the feature maps of all preceding layers and is configured to extract features based on the shared weights.

As described above, each of the first neural network 810 and the second neural network 820 generate 512 embeddings, and the embeddings are from the first neural network 810 and the second neural network 820 are shared. The first neural network 810 includes a concatenation embedding network (e.g., fully connected layers) that concatenates all the embeddings and provides the concatenated embeddings to a softmax layer to perform the classifications. The second neural network 820 includes a subtraction embedding network (e.g., fully connected layers) that subtracts embeddings and provides the differential embeddings to a softmax layer to perform the classifications. For example, the softmax layer can output probabilities of a state of the user, such as surprise, fear, disgust, happiness, sadness, anger, exhaustion, sleepiness, and neutral.

Figure 9:
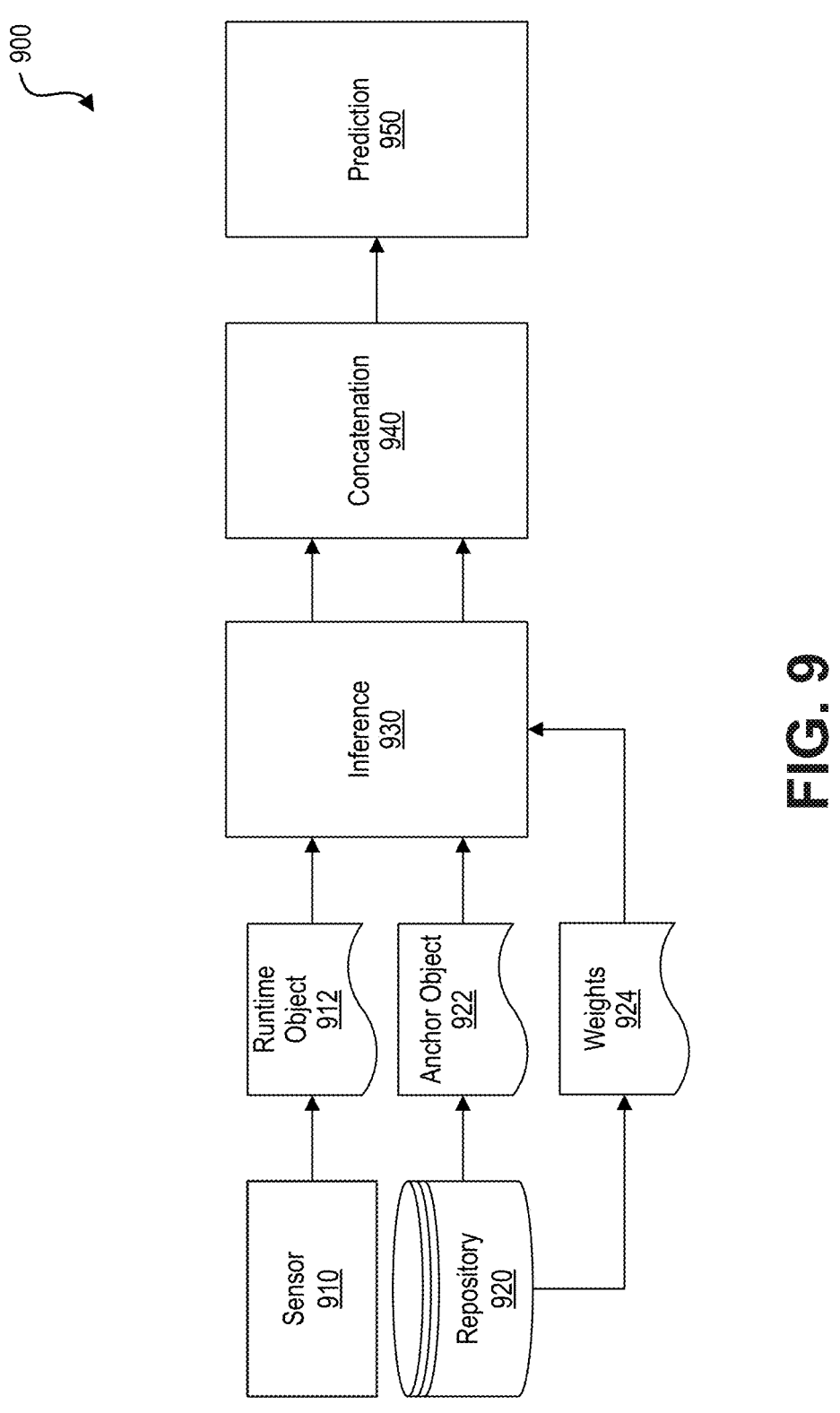
FIG. 9 illustrates a block diagram of a computer vision system for monitoring expressions at runtime, in accordance with certain aspects of the present disclosure

FIG. 9 illustrates a block diagram of a computer vision system 900 for monitoring expressions at runtime, in accordance with certain aspects of the present disclosure. In some aspects, the computer vision system 900 includes a sensor system 910 including at least one sensor (e.g., an image sensor, a ToF sensor, etc.), a repository 920 for storing information, an inference engine 930 to extract features, a concatenation engine 940, and a prediction engine 950.

In some aspects, the sensor system 910 is configured to provide a runtime object 912 to the inference engine 930 that is captured during the operation of the computer vision system 900. For example, the sensor system can include an image sensor and the runtime object 912 may include an image. In other examples, the sensor system 910 includes a ToF sensor and provides an array that identifies many (e.g., 30,000) distance measurements from the ToF sensor.

In some aspects, the repository 920 may be instructed to provide an anchor object 922 and weights 924 to the inference engine 930. The anchor object 922 may be data that is obtained or extracted during enrollment. For example, the anchor object 922 may be an image that is obtained during enrollment or may be features extracted from an image selected based on neutral expression and pose. For example, the anchor object 922 can be features extracted from a neural network, such as the expression information 750 in FIG. 7. The weights 924 may be trained offline, for example during the training illustrated in FIG. 7. In this case, the weights 924 are trained based on the back propagation into a parallel neural network that is configured to extract differences between a reference object (e.g., the anchor object 922) and input objects (e.g., the runtime object 912).

In some aspects, the inference engine 930 is configured to use the weights 924 to extract features at least from the runtime object 912. In the case that the anchor object 922 is sensor data, the inference engine 930 may also be configured to extract features from the anchor object 922 based on the weights 924. In one illustrative aspect, the inference engine 930 may be a convolution neural network (e.g., the convolution layers 712) and generates 512 embeddings. The inference engine 930 provides the extracted features of the runtime object 912 and the anchor object 922 to the concatenation engine 940 (e.g., the concatenator 714 of FIG. 7), and the concatenation engine 940 concatenates features extracted from the runtime object 912 and the anchor object 922.

The prediction engine 950 classifies the concatenated features from the concatenation engine 940 into probabilities and may be configured to select at least one classification. For example, the prediction engine 950 may be configured to classify expressions, such as a facial or a body expression.

Non-limiting examples of facial expressions include a state of the user include surprise, fear, disgust, happiness, sadness, anger, exhaustion, sleepiness, and neutral.

According to some aspects, the computer vision system 900 can use the state of the user for various purposes. In one aspect, the computer vision system 900 can be implemented into a driver monitoring system (DMS) to monitor a driver and prevent the driver of a vehicle from operating the vehicle when the driver is drowsy. The DMS may perform other safety-related functions, such as monitoring a driver of a semi-autonomous vehicle to ensure that the user can react within a minimum time to enable the driver to take over control of the vehicle.

FIG. 10 illustrates a block diagram of a vehicle 1000 that includes a computer vision system to monitor facial expressions, in accordance with certain aspects of the present disclosure. In this illustrative aspect, the vehicle 1000 includes compute components 1010, a sensor system 1020, a communication device 1030, and various monitoring and control systems.

The one or more compute components 1010 can include a CPU 1012, a GPU 1014, a DSP 1016, an ISP 1018, and/or other processor (e.g., a neural processing unit (NPU) implementing one or more trained neural networks). The compute components 1010 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein.

In some examples, the compute components 1010 can request or receive various sensor information provided by the sensor system 1020. In some aspects, the sensor system 1020 can include different types of sensors relevant to the vehicle. For example, the sensor system 420 can include at least of an image sensor 1021, a LIDAR sensor 1022, a radar sensor 1023, a ToF sensor 1024, and an ultrasonic sensor 1025.

The vehicle 1000 may include an environment monitoring engine 1040 that is configured to monitor the environment and drive the vehicle 1000 while preventing the vehicle 1000 from striking objects (e.g., a person). The vehicle 1000 may also include a driver monitoring engine 1042 that monitors the driver to ensure that the driver is attentive and can react to situations that the vehicle 1000 may find ambiguous. The driver monitoring engine 1042 may also monitor the driver to ensure that the vehicle 1000 is operating safely. For example, the driver monitoring engine 1042 may monitor the driver to ensure that the driver is sleepy. In some aspects, the driver monitoring engine 1042 may include the computer vision system 900 to detect facial expressions. The vehicle 1000 may also include a vehicle monitoring engine 1044 that monitors aspects of the vehicle such as battery information, drive train information, etc. It should be noted that the engines 1040-1044 are non-limiting examples, and more or less engines may be included within the vehicle 1000.

In some aspects the vehicle 1000 can also include a plurality of control systems, such as a brake control system 1050, a drivetrain control system 1052, and a steering control system 1054. The brake control system 1050, the drivetrain control system 1052, and the steering control system 1054 may be separate hardware devices, or may at least partially be implemented based on the compute components 1010. In some aspects, the brake control system 1050, the drivetrain control system 1052, and the steering control system 1054 may be configured to control the vehicle 1000 in some circumstances. For example, the brake control system 1050, the drivetrain control system 1052, and the steering control system 1054 may be configured to perform a cruise control function. In other examples, the brake control system 1050, the drivetrain control system 1052, and the steering control system 1054 may be configured to perform partial or fully autonomous control of the vehicle 1000.

It should be noted that the vehicle 1000 can implement additional control systems for other functionality. For example, the vehicle 1000 can include an auxiliary control system for controlling interior functions (e.g., heating, cooling) or other driving-related functions, such as a tire pressure monitoring system, a fuel control system, and so forth.

Figure 11:
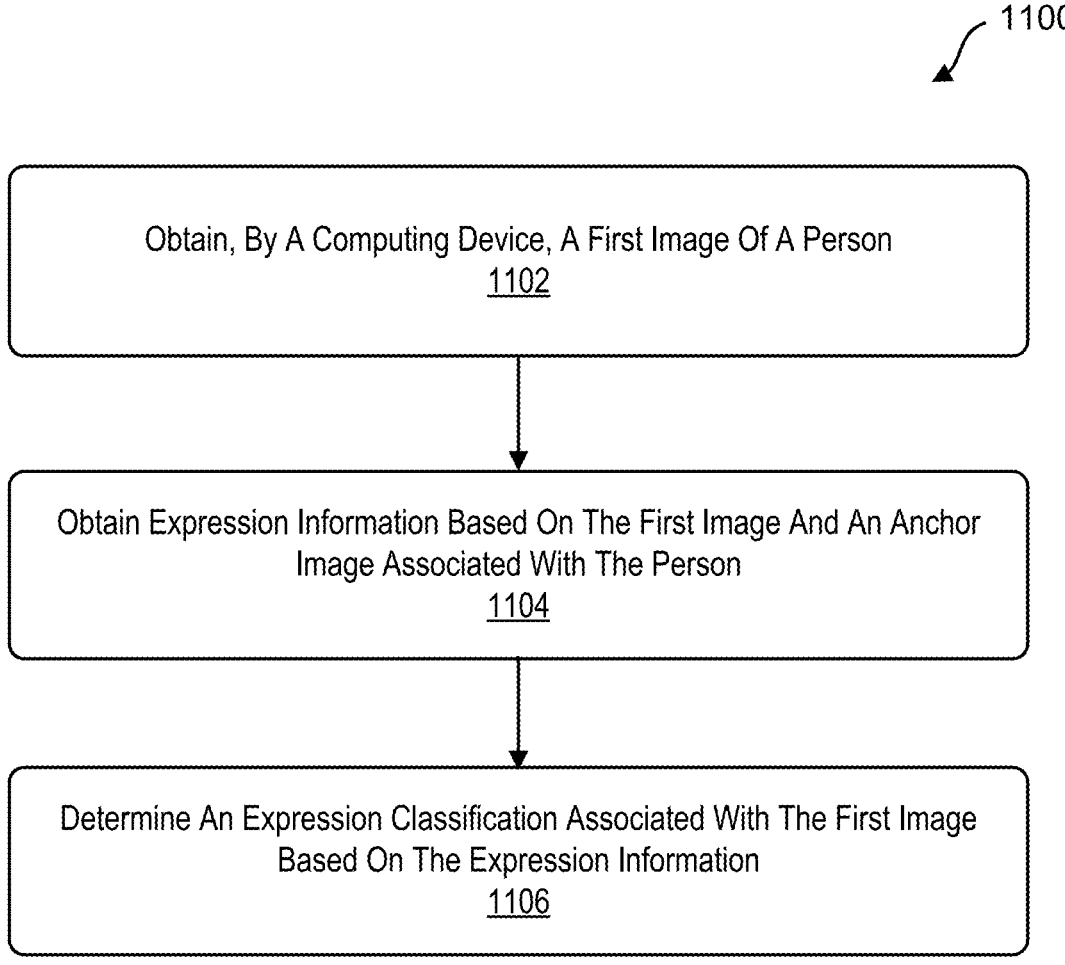
FIG. 11 is a flowchart illustrating an example of a method for facial expression recognition, in accordance with certain aspects of the present disclosure.

FIG. 11 is a flowchart illustrating an example of a method 1100 for processing image data, in accordance with certain aspects of the present disclosure. The method 1100 can be performed by a computing device (or a component of the computing device) having a touch screen, such as a mobile wireless communication device, a smart speaker, a camera, an XR device, a wireless-enabled vehicle, or another computing device. In one illustrative example, the computing system can be integral to a vehicle and may obtain a picture of a person while the person is operating the vehicle. In one illustrative example, a computing system 1400 can be configured to perform all or part of the method 1100.

At block 1102, the computing system (e.g., the computing system 1400) is configured to obtain a first image of a person. At block 1104, the computing system is configured to obtain expression information based on the first image and an anchor image associated with the person. For example, the computing system of a vehicle can be configured to obtain expression information of a driver of the vehicle while operating the vehicle, such as whether the person is drowsy, angry, etc. In one aspect, the expression information comprises facial information of the person. The expression information is any suitable type of information that can be used by the computing system to identify various expressions. For example, the expression information can include various properties related to the eye, such as eye opening, orientation of distal ends of the lips, biasing information associated with the facial muscles, and so forth. The expression information is provided in any form suitable for a computer to process, such as grouping different features, vectors that identify various angles and lengths, bitmaps, and so forth. In some aspects, the expression information can modeled using an object that identifies various key points and features, such as left eye, right eye, and can be used in a neural network for facial detection, facial expression detection, and so forth.

In one aspect, to obtain the expression information at block 1104, the computing system may obtain first expression information extracted from the anchor image of the person using a neural network. In one aspect, the first expression information is extracted from the anchor image and stored during enrollment of the person. In another aspect, the first expression information is extracted from the anchor image that is stored during enrollment, and the first expression information is extracted at runtime from the anchor image. In some cases, extraction of facial features at runtime may be beneficial based on improvements in various engines, such as the facial detection engine or the face expression engine.

In one aspect, to obtain the expression information at block 1104, the computing system may obtain second expression information from the first image of the person using the neural network. In one aspect, the computing system may combine the first expression information and the second expression information into probabilities associated with different expression classifications. The computing system may also select the expression classification as a first expression associated with the first expression information or a second expression associated with the second expression information based on the probabilities associated with the different expression classifications. In this illustrative aspect, the neural network is trained based on a different combination of the expression information. In one example, the neural network is trained using first combination of the first expression information and the second expression information and a second combination of the first expression information and the second expression information. In some cases, the first expression information and the second expression information are extracted from a reference image of a subject and a biased image of the subject. In one aspect, the neural network is trained using at least two images of a subject, such as a picture of the subject smiling, and a picture of the subject with a neutral facial expression (e.g., no facial expression). For example, the subject comprises a face of a person, the reference image comprises the person without a facial expression, and the biased image comprises the person with a facial expression. The first combination comprises a concatenation of the first expression information and the second expression information, and the second combination comprises a subtraction of the first expression information and the second expression information.

At block 1106, the computing system is configured to determine an expression classification associated with the first image based on the expression information. In one aspect, the expression classification comprises a facial expression of the person. Non-limiting examples of expression classification include surprise, fear, disgust, happiness, sadness, anger, exhaustion, sleepiness, and neutral.

In some aspects, the computing system may determine a state of the computing system based on a facial expression. In the illustrative example of a vehicle, if the computing determines that the person is attentive, the computing system maintains the vehicle in a normal driving state. On the other hand, if the computing determines that the person is drowsy, the computing system may warn the user and disable the vehicle. In the illustrative example of a semi-autonomous vehicle that is required to be monitored by a driver, if the computing determines that the driver is drowsy, the computing system may configure the semi-autonomous vehicle to autonomously maneuver to a place for allowing the driver to rest.

Aspects of the disclosure also include capturing images for enrollment. In one aspect, the computing system may obtain an enrollment image of the person during enrollment of the person. For example, when the person is configuring a vehicle before driving the vehicle the first time, the computing system of the vehicle may require the user to enroll based on capturing images of the person. The computing system may obtain pose information associated with the person based on the enrollment image. For example, the pose information can identify the pose of the person's head, such as rotation along a yaw, pitch or roll axis.

In some aspects, the computing system may obtain facial information associated with a face of the person based on the enrollment image, and determine whether the enrollment image is selected as the anchor image based on the pose information and the facial information. For example, if the person's head is rotated along a yaw axis beyond 30°, the computing system may be unable to accurately extract the facial information. In another example, if the computing system detects that the person is biasing their face (e.g., smiling, frowning), the computing system may be unable to accurately extract the facial information. In some cases, the computing system may require an additional enrollment image. In some other cases, when an initial enrollment image is not selected as the anchor image, the computing system may generate the anchor image from the enrollment image. For example, the computing system may be configured to rotate the 2D image using 3D translation techniques, and the facial expression information can be extracted. In other cases, the computing system may be configured with a generative neural network that can modify the initial enrollment image using generative techniques. For example, the generative neural network can be configured to replace a smile of the person with mouth having a neutral mouth position.

Figure 12:
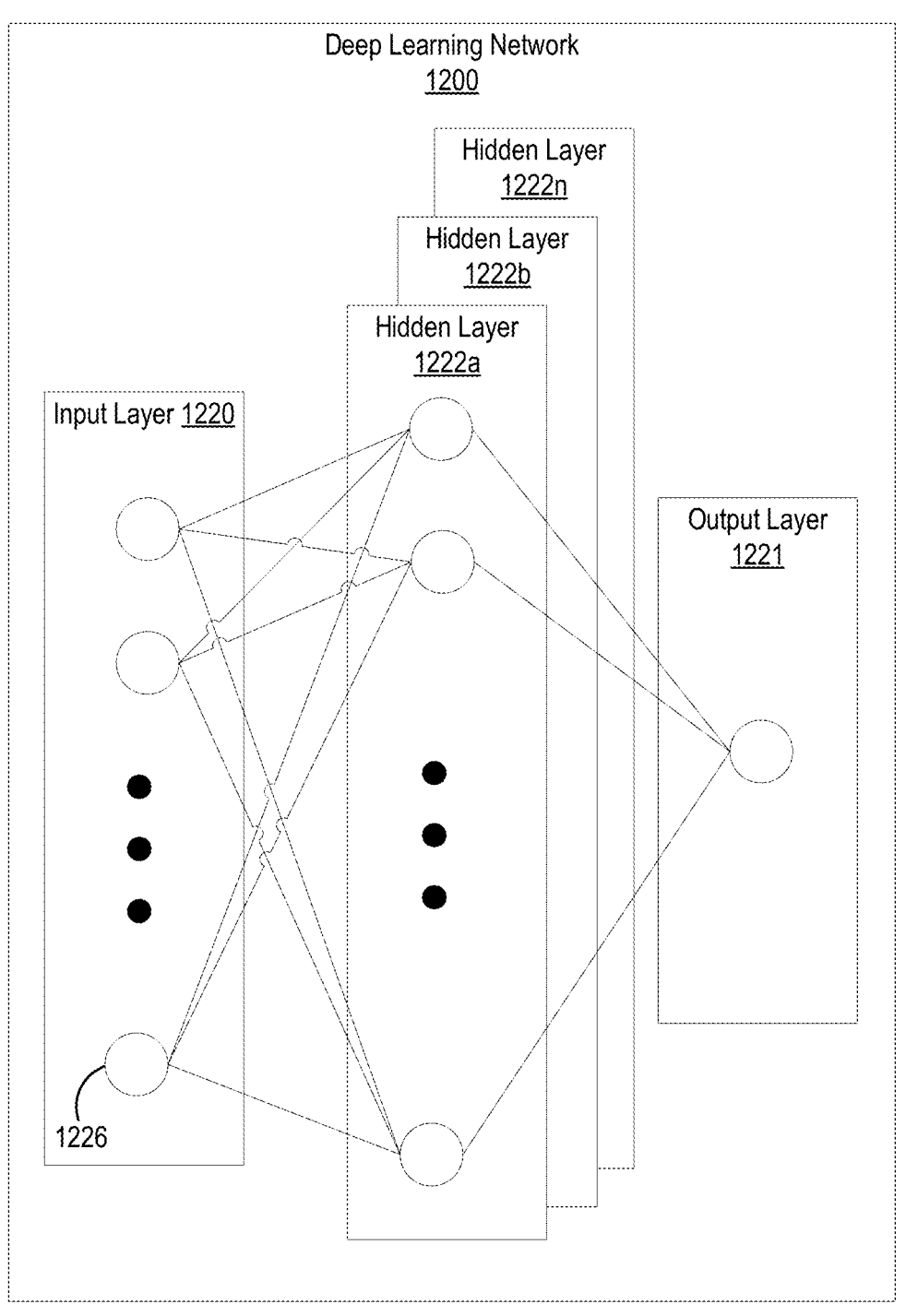
FIG. 12 is an illustrative example of a deep learning neural network that can be used to implement the machine learning-based alignment prediction, in accordance with aspects of the present disclosure.

As noted above, various aspects of the present disclosure can use machine learning models or systems. FIG. 12 is an illustrative example of a deep learning neural network 1200 that can be used to implement the machine learning-based alignment prediction described above. An input layer 1220 includes input data. In one illustrative example, the input layer 1220 can include data representing the pixels of an input video frame. The neural network 1200 includes multiple hidden layers 1222a, 1222b, through 1222n. The hidden layers 1222a, 1222b, through 1222n include "n" number of hidden layers, where "n" is an integer greater than or equal to one. The number of hidden layers can be made to include as many layers as needed for the given application. The neural network 1200 further includes an output layer 1221 that provides an output resulting from the processing performed by the hidden layers 1222a, 1222b, through 1222n. In one illustrative example, the output layer 1221 can provide a classification for an object in an input video frame. The classification can include a class identifying the type of activity (e.g., looking up, looking down, closing eyes, yawning, etc.).

The neural network 1200 is a multi-layer neural network of interconnected nodes. Each node can represent a piece of information. Information associated with the nodes is shared among the different layers and each layer retains information as information is processed. In some cases, the neural network 1200 can include a feed-forward network, in which case there are no feedback connections where outputs of the network are fed back into itself. In some cases, the neural network 1200 can include a recurrent neural network, which can have loops that allow information to be carried across nodes while reading in input.

Information can be exchanged between nodes through node-to-node interconnections between the various layers. Nodes of the input layer 1220 can activate a set of nodes in the first hidden layer 1222a. For example, as shown, each of the input nodes of the input layer 1220 is connected to each of the nodes of the first hidden layer 1222a. The nodes of the first hidden layer 1222a can transform the information of each input node by applying activation functions to the input node information. The information derived from the transformation can then be passed to and can activate the nodes of the next hidden layer 1222b, which can perform their own designated functions. Example functions include convolutional, up-sampling, data transformation, and/or any other suitable functions. The output of the hidden layer 1222b can then activate nodes of the next hidden layer, and so on. The output of the last hidden layer 1222*n* can activate one or more nodes of the output layer 1221, at which an output is provided. In some cases, while nodes (e.g., node 1226) in the neural network 1200 are shown as having multiple output lines, a node has a single output and all lines shown as being output from a node represent the same output value.

In some cases, each node or interconnection between nodes can have a weight that is a set of parameters derived from the training of the neural network 1200. Once the neural network 1200 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 1200 to be adaptive to inputs and able to learn as more and more data is processed.

The neural network 1200 is pre-trained to process the features from the data in the input layer 1220 using the different hidden layers 1222*a*, 1222*b*, through 1222*n* in order to provide the output through the output layer 1221. In an example in which the neural network 1200 is used to identify features and/or objects in images, the neural network 1200 can be trained using training data that includes both images and labels, as described above. For instance, training images can be input into the network, with each training frame having a label indicating the features in the images (for a feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 1200 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 1200 is trained well enough so that the weights of the layers are accurately tuned.

For the example of identifying features and/or objects in images, the forward pass can include passing a training image through the neural network 1200. The weights are initially randomized before the neural network 1200 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 1200, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1200 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as a risk function that corresponds to the expected value of the squared error loss and measures the quality of estimation provided by the neural network 1200.

The loss (or error) will be high for the first training images since the actual values will be much different than the predicted output. The goal of training is to minimize the amount of loss so that the predicted output is the same as the training label. The neural network 1200 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as, where w denotes a weight, $w_i$ denotes the initial weight, and η denotes a learning rate. The learning rate can be set to any suitable value, with a high learning rate including larger weight updates and a lower value indicating smaller weight updates.

The neural network 1200 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 1200 can include any other deep network other than a CNN, such as an autoencoder, a deep belief nets (DBNs), a Recurrent Neural Networks (RNNs), among others.

Figure 13:
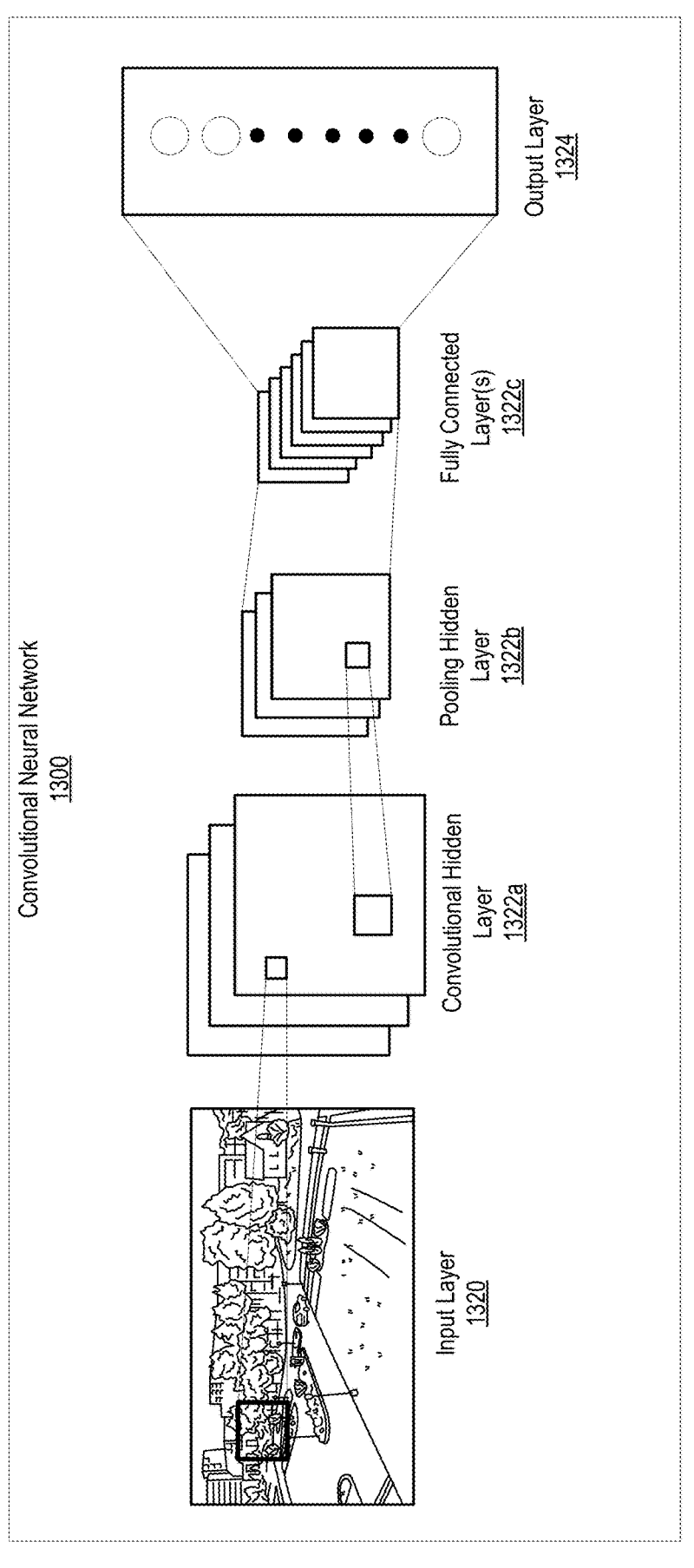
FIG. 13 is an illustrative example of a convolutional neural network (CNN), in accordance with aspects of the present disclosure.

FIG. 13 is an illustrative example of a CNN 1300. The input layer 1320 of the CNN 1300 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1322*a*, an optional non-linear activation layer, a pooling hidden layer 1322*b*, and fully connected hidden layers 1322*c* to get an output at the output layer 1324. While only one of each hidden layer is shown in FIG. 13, one of ordinary skill will appreciate that multiple convolutional hidden layers, non-linear layers, pooling hidden layers, and/or fully connected layers can be included in the CNN 1300. As previously described, the output can indicate a single class of an object or can include a probability of classes that best describe the object in the image.

The first layer of the CNN 1300 is the convolutional hidden layer 1322*a*. The convolutional hidden layer 1322*a* analyzes the image data of the input layer 1320. Each node of the convolutional hidden layer 1322*a* is connected to a region of nodes (pixels) of the input image called a receptive field. The convolutional hidden layer 1322*a* can be considered as one or more filters (each filter corresponding to a different activation or feature map), with each convolutional iteration of a filter being a node or neuron of the convolutional hidden layer 1322a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1322a. Each connection between a node and a receptive field for that node learns a weight and, in some cases, an overall bias such that each node learns to analyze its particular local receptive field in the input image. Each node of the hidden layer 1322a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1322a is due to each node of the convolutional layer being applied to its corresponding receptive field. For example, a filter of the convolutional hidden layer 1322a can begin in the top-left corner of the input image array and can convolve around the input image. As noted above, each convolutional iteration of the filter can be considered a node or neuron of the convolutional hidden layer 1322a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1322a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1322a.

The mapping from the input layer to the convolutional hidden layer 1322a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1322a can include several activation maps in order to identify multiple features in an image. The example shown in FIG. 13 includes three activation maps. Using three activation maps, the convolutional hidden layer 1322a can detect three different kinds of features, with each feature being detectable across the entire image.

In some examples, a non-linear hidden layer can be applied after the convolutional hidden layer 1322a. The non-linear layer can be used to introduce non-linearity to a system that has been computing linear operations. One illustrative example of a non-linear layer is a ReLU layer. A ReLU layer can apply the function f(x)=max(0, x) to all of the values in the input volume, which changes all the negative activations to 0. The ReLU can thus increase the non-linear properties of the CNN 1300 without affecting the receptive fields of the convolutional hidden layer 1322a.

The pooling hidden layer 1322b can be applied after the convolutional hidden layer 1322a (and after the non-linear hidden layer when used). The pooling hidden layer 1322b is used to simplify the information in the output from the convolutional hidden layer 1322a. For example, the pooling hidden layer 1322b can take each activation map output from the convolutional hidden layer 1322a and generates a condensed activation map (or feature map) using a pooling function. Max-pooling is one example of a function performed by a pooling hidden layer. Other forms of pooling functions be used by the pooling hidden layer 1322a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1322a. In the example shown in FIG. 13, three pooling filters are used for the three activation maps in the convolutional hidden layer 1322a.

In some examples, max-pooling can be used by applying a max-pooling filter (e.g., having a size of 2×2) with a stride (e.g., equal to a dimension of the filter, such as a stride of 2) to an activation map output from the convolutional hidden layer 1322a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1322a having a dimension of 24×24 nodes, the output from the pooling hidden layer 1322b will be an array of 18×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1300.

The final layer of connections in the network is a fully-connected layer that connects every node from the pooling hidden layer 1322b to every one of the output nodes in the output layer 1324. Using the example above, the input layer includes 28×28 nodes encoding the pixel intensities of the input image, the convolutional hidden layer 1322a includes 3×24×24 hidden feature nodes based on application of a 5×5 local receptive field (for the filters) to three activation maps, and the pooling hidden layer 1322b includes a layer of 3×12×12 hidden feature nodes based on application of max-pooling filter to 2×2 regions across each of the three feature maps. Extending this example, the output layer 1324 can include ten output nodes. In such an example, every node of the 3×12×12 pooling hidden layer 1322b is connected to every node of the output layer 1324.

The fully connected layer 1322c can obtain the output of the previous pooling hidden layer 1322b (which should represent the activation maps of high-level features) and determines the features that most correlate to a particular class. For example, the fully connected layer 1322c layer can determine the high-level features that most strongly correlate to a particular class, and can include weights (nodes) for the high-level features. A product can be computed between the weights of the fully connected layer 1322c and the pooling hidden layer 1322b to obtain probabilities for the different classes. For example, if the CNN 1300 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1324 can include an M-dimensional vector (in the prior example, M=10). M indicates the number of classes that the CNN 1300 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

In some examples, the processes described herein (e.g., methods 500 and 1100, and/or other process described herein) may be performed by a computing device or apparatus. In one example, the methods 500 and 1100 can be performed by a computing device including a touch screen having a computing architecture of the computing system 1400 shown in FIG. 14.

The computing device can include any suitable device, such as a mobile device (e.g., a mobile phone), a desktop computing device, a tablet computing device, a wearable device (e.g., a virtual reality (VR) headset, an augmented reality (AR) headset, AR glasses, a network-connected watch or smartwatch, or other wearable device), a server computer, an autonomous vehicle or computing device of an autonomous vehicle, a robotic device, a television, and/or any other computing device with the resource capabilities to perform the methods described herein, including the methods 500 and 1100. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of methods described herein. In some examples, the computing device may include a display, a network interface configured to communicate and/or receive the data, any combination thereof, and/or other component(s). The network interface may be configured to communicate and/or receive IP-based data or other type of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

The methods 500 and 1100 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the methods.

The methods 500 and 1100 and/or other method or process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 14 is a diagram illustrating an example of a system for implementing certain aspects of the present technology. In particular, FIG. 14 illustrates an example of computing system 1400, which can be for example any computing device making up internal computing system, a remote computing system, a camera, or any component thereof in which the components of the system are in communication with each other using connection 1405. Connection 1405 can be a physical connection using a bus, or a direct connection into processor 1410, such as in a chipset architecture. Connection 1405 can also be a virtual connection, networked connection, or logical connection.

In some aspects, computing system 1400 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 1400 includes at least one processing unit (CPU or processor) 1410 and connection 1405 that couples various system components including system memory 1415, such as ROM 1420 and RAM 1425 to processor 1410. Computing system 1400 can include a cache 1412 of high-speed memory connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms. In some instances, multimodal systems can enable a user to provide multiple types of input/output to communicate with computing system 1400. Computing system 1400 can include communications interface 1440, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1430 can include software services, servers, services, etc., that when the code that defines such software is executed by the processor 1410, it causes the system to perform a function. In some aspects, a hardware service that performs a particular function can include the software component stored in a computer-readable medium in connection with the necessary hardware components, such as processor 1410, connection 1405, output device 1435, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 3G, 5G, and/or other cellular standard, data according to the Wi-Fi (802.11x) standard, data according to the Bluetooth™ standard, data according to the IP standard, and/or other types of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method for recognizing facial expressions in one or more images, comprising: obtaining, by a computing device, a first image of a person; obtaining expression information based on the first image and an anchor image associated with the person; and determining an expression classification associated with the first image based on the expression information.

Aspect 2. The method of Aspect 1, wherein the expression information comprises facial information and the expression classification comprises a facial expression of the person.

Aspect 3. The method of any of Aspects 1 or 2, wherein obtaining the expression information comprises: obtaining first expression information extracted from the anchor image of the person using a neural network.

Aspect 4. The method of Aspect 3, wherein the first expression information is extracted from the anchor image and stored during enrollment of the person.

Aspect 5. The method of any of Aspects 3 or 4, wherein the first expression information is extracted from the anchor image that is stored during enrollment.

Aspect 6. The method of any of Aspects 3 to 5, wherein obtaining the expression information further comprises: obtaining second expression information from the first image of the person using the neural network.

Aspect 7. The method of Aspect 6, further comprising: combining the first expression information and the second expression information into probabilities associated with different expression classifications; and selecting the expression classification as a first expression associated with the first expression information or a second expression associated with the second expression information based on the probabilities associated with the different expression classifications.

Aspect 8. The method of Aspect 7, wherein the neural network is trained based on a first combination of the first expression information and the second expression information and a second combination of the first expression information and the second expression information, and wherein the first expression information and the second expression information are extracted from a reference image of a subject and a biased image of the subject.

Aspect 9. The method of Aspect 8, wherein the first combination of the first expression information and the second expression information comprises a concatenation of the first expression information and the second expression information.

Aspect 10. The method of any of Aspects 8 or 9, wherein the second combination of the first expression information and the second expression information comprises a subtraction of the first expression information and the second expression information.

Aspect 11. The method of any of Aspects 8 to 10, wherein the subject comprises a face of a person, the reference image comprises the person without a facial expression, and the biased image comprises the person with a facial expression.

Aspect 12. The method of any of Aspects 1 to 11, further comprising: obtaining an enrollment image of the person during enrollment of the person.

Aspect 13. The method of Aspect 12, further comprising: obtaining pose information associated with the person based on the enrollment image; obtaining facial information associated with a face of the person based on the enrollment image; and determining whether the enrollment image is selected as the anchor image based on the pose information and the facial information.

Aspect 14. The method of any of Aspects 1 to 13, further comprising: generating the anchor image from the first image based on the first image not being selected as the anchor image.

Aspect 15. The method of any of Aspects 1 to 14, further comprising: determining a state of the computing device based on a facial expression.

Aspect 16. An apparatus for recognizing facial expressions in one or more images, comprising at least one memory; and at least one processor coupled to the at least one memory and configured to: obtain a first image of a person; obtain expression information based on the first image and an anchor image associated with the person; and determine an expression classification associated with the first image based on the expression information.

Aspect 17. The apparatus of Aspect 16, wherein the expression information comprises facial information and the expression classification comprises a facial expression of the person.

Aspect 18. The apparatus of any of Aspects 16 or 17, wherein the at least one processor is configured to: obtain first expression information extracted from the anchor image of the person using a neural network.

Aspect 19. The apparatus of Aspect 18, wherein the first expression information is extracted from the anchor image and stored during enrollment of the person.

Aspect 20. The apparatus of any of Aspects 18 or 19, wherein the first expression information is extracted from the anchor image that is stored during enrollment.

Aspect 21. The apparatus of any of Aspects 18 to 20, wherein the at least one processor is configured to: obtain second expression information from the first image of the person using the neural network.

Aspect 22. The apparatus of Aspect 21, wherein the at least one processor is configured to: combine the first expression information and the second expression information into probabilities associated with different expression classifications; and select the expression classification as a first expression associated with the first expression information or a second expression associated with the second expression information based on the probabilities associated with the different expression classifications.

Aspect 23. The apparatus of Aspect 22, wherein the neural network is trained based on a first combination of the first expression information and the second expression information and a second combination of the first expression information and the second expression information, and wherein the first expression information and the second expression information are extracted from a reference image of a subject and a biased image of the subject.

Aspect 24. The apparatus of Aspect 23, wherein the first combination of the first expression information and the second expression information comprises a concatenation of the first expression information and the second expression information.

Aspect 25. The apparatus of any of Aspects 23 or 24, wherein the second combination of the first expression information and the second expression information comprises a subtraction of the first expression information and the second expression information.

Aspect 26. The apparatus of any of Aspects 23 to 25, wherein the subject comprises a face of a person, the reference image comprises the person without a facial expression, and the biased image comprises the person with a facial expression.

Aspect 27. The apparatus of any of Aspects 16 to 26, wherein the at least one processor is configured to: obtain an enrollment image of the person during enrollment of the person.

Aspect 28. The apparatus of Aspect 27, wherein the at least one processor is configured to: obtain pose information associated with the person based on the enrollment image; obtain facial information associated with a face of the person based on the enrollment image; and determine whether the enrollment image is selected as the anchor image based on the pose information and the facial information.

Aspect 29. The apparatus of any of Aspects 16 to 28, wherein the at least one processor is configured to: generate the anchor image from the first image based on the first image not being selected as the anchor image.

Aspect 30. The apparatus of any of Aspects 16 to 29, wherein the at least one processor is configured to: determine a state of the apparatus based on a facial expression.

Aspect 31. A non-transitory computer-readable medium comprising instructions which, when executed by one or more processors, cause the one or more processors to perform operations according to any of Aspects 1 to 15.

Aspect 32. An apparatus comprising means for performing operations according to any of Aspects 1 to 15.

What is claimed is:

1. A method for recognizing facial expressions in one or more images, comprising:

obtaining, by a computing device, a first image of a person;

obtaining expression information based on the first image of the person and an anchor image of the person using a neural network, wherein the expression information comprises feature vectors associated with facial features, wherein the expression information includes first expression information extracted from the anchor image and stored during enrollment of the person; and determining, using a trained machine learning model, an expression classification associated with the first image of the person based on the expression information obtained based on the first image of the person and the anchor image of the person.

2. The method of claim 1, wherein the expression classification comprises a facial expression of the person.

3. The method of claim 1, wherein obtaining the expression information further comprises:

obtaining second expression information from the first image of the person using the neural network.

4. The method of claim 3, further comprising:

combining the first expression information and the second expression information into probabilities associated with different expression classifications; and selecting the expression classification as a first expression associated with the first expression information or a second expression associated with the second expression information based on the probabilities associated with the different expression classifications.

5. The method of claim 4, wherein the neural network is trained based on a first combination of the first expression information and the second expression information and a second combination of the first expression information and the second expression information, and wherein the first expression information and the second expression information are extracted from a reference image of a subject and a biased image of the subject.

6. The method of claim 5, wherein the first combination of the first expression information and the second expression information comprises a concatenation of the first expression information and the second expression information.

7. The method of claim 5, wherein the second combination of the first expression information and the second expression information comprises a subtraction of the first expression information and the second expression information.

8. The method of claim 5, wherein the subject comprises a face of a person, the reference image comprises the person without a facial expression, and the biased image comprises the person with a facial expression.

9. The method of claim 1, further comprising:
obtaining an enrollment image of the person during enrollment of the person.

10. The method of claim 9, further comprising:
obtaining pose information associated with the person based on the enrollment image;
obtaining facial information associated with a face of the person based on the enrollment image; and
determining whether the enrollment image is selected as the anchor image based on the pose information and the facial information.

11. The method of claim 1, further comprising:
generating the anchor image from the first image based on the first image not being selected as the anchor image.

12. The method of claim 1, further comprising:
determining a state of the computing device based on a facial expression.

13. An apparatus for recognizing facial expressions in one or more images, comprising:
at least one memory; and
at least one processor coupled to the at least one memory and configured to:
obtain a first image of a person;
obtain expression information based on the first image of the person and an anchor image of the person using a neural network, wherein the expression information comprises feature vectors associated with facial features, wherein the expression information includes first expression information extracted from the anchor image and stored during enrollment of the person; and
determine, using a trained machine learning model, an expression classification associated with the first image of the person based on the expression information obtained based on the first image of the person and the anchor image of the person.

14. The apparatus of claim 13, wherein the expression classification comprises a facial expression of the person.

15. The apparatus of claim 13, wherein the at least one processor is configured to:
obtain second expression information from the first image of the person using the neural network.

16. The apparatus of claim 15, wherein the at least one processor is configured to:
combine the first expression information and the second expression information into probabilities associated with different expression classifications; and
select the expression classification as a first expression associated with the first expression information or a second expression associated with the second expression information based on the probabilities associated with the different expression classifications.

17. The apparatus of claim 16, wherein the neural network is trained based on a first combination of the first expression information and the second expression information and a second combination of the first expression information and the second expression information, and wherein the first expression information and the second expression information are extracted from a reference image of a subject and a biased image of the subject.

18. The apparatus of claim 17, wherein the first combination of the first expression information and the second expression information comprises a concatenation of the first expression information and the second expression information.

19. The apparatus of claim 17, wherein the second combination of the first expression information and the second expression information comprises a subtraction of the first expression information and the second expression information.

20. The apparatus of claim 17, wherein the subject comprises a face of a person, the reference image comprises the person without a facial expression, and the biased image comprises the person with a facial expression.

21. The apparatus of claim 13, wherein the at least one processor is configured to:
obtain an enrollment image of the person during enrollment of the person.

22. The apparatus of claim 21, wherein the at least one processor is configured to:
obtain pose information associated with the person based on the enrollment image;
obtain facial information associated with a face of the person based on the enrollment image; and
determine whether the enrollment image is selected as the anchor image based on the pose information and the facial information.

23. The apparatus of claim 13, wherein the at least one processor is configured to:
generate the anchor image from the first image based on the first image not being selected as the anchor image.

24. The apparatus of claim 13, wherein the at least one processor is configured to:
determine a state of the apparatus based on a facial expression.

* * * * *